United States Patent
Candler et al.

(10) Patent No.: US 6,917,363 B2
(45) Date of Patent: Jul. 12, 2005

(54) METHOD AND SYSTEM FOR PROCESSING TWO-DIMENSIONAL IMAGE DATA

(75) Inventors: Frederick Christopher Candler, Etobicoke (CA); Louie Lee, Richmond Hill (CA)

(73) Assignee: Silicon Optix Inc., San Jose, CA (US)

(*) Notice: Subject to any disclaimer, the term of this patent is extended or adjusted under 35 U.S.C. 154(b) by 301 days.

(21) Appl. No.: 10/166,387

(22) Filed: Jun. 11, 2002

(65) Prior Publication Data

US 2002/0196260 A1 Dec. 26, 2002

Related U.S. Application Data

(60) Provisional application No. 60/296,750, filed on Jun. 11, 2001.

(51) Int. Cl.[7] .................................................. G06T 1/60
(52) U.S. Cl. ........................ 345/530; 345/531; 382/235
(58) Field of Search ................................. 345/530, 531; 382/232, 235, 260; 348/222.1, 571, 667

(56) References Cited

U.S. PATENT DOCUMENTS 5,859,651 A    1/1999    Potu

FOREIGN PATENT DOCUMENTS

| EP | 0 651 351 A1 | 3/1995 |
| EP | 0 959 428 A2 | 5/1998 |
| GB | 2 335 126 A | 8/1999 |

*Primary Examiner*—Matthew C. Bella
*Assistant Examiner*—Mackly Monestime
(74) *Attorney, Agent, or Firm*—Charles Bruzga; Bruzga & Associates

(57) ABSTRACT

An image data processing method and system receives image data from a burst memory buffer and provides output image data to a vertical filter for filtering. The method determines whether a new frame of input image data has been received, said frame of data having a plurality of blocks, each block having a plurality of rows and columns. A vertical input buffer uses a read pointer, an oldest unused data pointer, and a write pointer to keep track of the data that is being read and stored. Data is read and stored into said vertical input buffer by determining the minimum offset for the block, reading a row of input image data from the burst memory buffer and skipping the row depending on the minimum offset until minimum offset reached, and storing the row of input image data in said vertical input buffer for processing by the vertical filter until the buffer is full. If the entire frame has been processed then the pointers are all reset. If an entire column in the output image has been processed then the column data is flushed. In another embodiment, a low latency mode is adopted such that it is not necessary for the columns to be completely processed before switching to the next column horizontally.

14 Claims, 20 Drawing Sheets

METHOD AND SYSTEM FOR PROCESSING TWO-DIMENSIONAL IMAGE DATA

This application claims priority from U.S. Provisional Patent Application No. 60/296,750 filed Jun. 11, 2001.

FIELD OF THE INVENTION

This invention relates to systems and methods for processing data for image processing, and more particularly for buffering techniques to allow for efficient use of this data by filtering engines.

BACKGROUND OF THE INVENTION

For image processing, filtering engines require random access to memory due to the fact that images are at least two dimensional. The term random access means that the system can access any data value inside the memory. Burst memory devices (such as DRAM, SDRAM and DDR memory) do not provide random access in burst mode. Burst mode refers to memories which provide data access in groups (i.e. bursts) of data as opposed to single data values. Burst-based memories are used more and more in today's data intensive applications.

As an example, assuming there is a memory with burst size of 16 pixels across, and data from it is required for vertical processing, if a non buffering technique is employed as data is being read row-wise, every 16th pixel that is read would be a pixel that would be required for vertical processing for one particular column. For the processing engine to only make use of every 16th pixel that is read out is extremely inefficient.

Current art when addressing this problem of trying to increase efficiency, employs a cache storage technique to ensure that the required data for processing is always available. Caching is a viable solution to the problem, but is marred by significantly increased complexity. Caching techniques require among other things, that checks be done to determine cache misses as well as data coherency checking, all of which result in increased complexity.

Patents such as U.S. Pat. No. 5,859,651 to Potu have attempted to deal with the issues surrounding image processing. This patent employs concepts such as FIFO (First-in First out Buffers), as well as block dimensions which are square, for when the data is being processed. Also, the filtering process that is employed with U.S. Pat. No. 5,859,651 is one that requires data that is to be processed to be resent between blocks that are being processed. As a result, the system may not be utilized as efficiently as one would like.

SUMMARY OF INVENTION

The invention provides in one aspect, an image data processing method for receiving input image data from a burst memory buffer and providing output image data to a vertical filter for filtering, said method comprising:
  (a) determining whether a new frame of input image data has been received, said frame of data having one or more blocks, each block having one or more rows and columns;
  (b) reading and storing data from the burst memory buffer to a vertical input buffer for processing by a vertical filter, wherein vertical input buffer comprises one or more rows and columns and a plurality of pointers to be used in processing data;
  (c) determining if the entire frame has been processed, and if so, resetting said pointers so as to be able to process new frame of input image data;
  (d) determining if an entire column in the output image has been processed, and if so, resetting pointers; and
  (e) determining if the entire block has been processed, and if so, repeating (b) to (d).

The invention provides in another aspect an image data processing system for receiving input image data from a burst memory buffer and providing output image data to a vertical filter for filtering, said system comprising:
  (a) a processor for determining whether a new frame of input image data has been received, said frame of data having one or more blocks, each block having one or more, rows and columns;
  (b) a vertical input buffer coupled to the processor, said vertical input buffer having one or more rows and columns and a plurality of pointers to be used in processing data;
  (c) a processor for reading and storing data into said vertical input buffer; (d) a processor for determining if the entire frame has been processed and if so resetting one or more of said pointers so as to be able to process anew frame of input image data;
  (e) a processor for determining if an entire column has been processed and if so resetting one or more of said pointers;
  (f) a processor for determining if the entire block has been processed and if so repeating (c) to (e).

The invention provides in another aspect an image data processing method for receiving input image data from a burst memory buffer and providing output image data to a vertical filter for filtering, said method comprising:
  (a) determining whether a new frame of input image data has been received, said frame of data having one or more blocks, each block having one or more rows and columns and wherein the vertical filter processes the output image data by processing strips comprising horizontal rows of blocks across the image;
  (b) reading and storing data from the burst memory buffer to a vertical input buffer for processing by a vertical filter, wherein the vertical input buffer comprises one or more rows and columns and a plurality of pointers to be used in processing data;
  (c) determining if the entire block has been processed, and if not, repeating (b) for the next horizontal block;
  (d) determining if the entire strip of the output image has been processed, and if not, repeating (b) and (c) for the next horizontal block;
  (e) determining if the entire frame has been precessed, and if not, repeating (b) to (d) for the next horizontal block in the next strip, and resetting said pointers.

The invention provides in another aspect an image data processing system for receiving input image data from a burst memory buffer and providing output image data to a vertical filter for filtering, said system comprising:
  (a) a processor for determining whether a new frame of input image data has been received, said frame of data having one or more blocks, each block having one or more rows and columns and wherein the vertical filter processes the output image data by processing strips comprising horizontal rows of blocks across the image;
  (b) a vertical input buffer having one or more rows and columns and a plurality of pointers to be used in processing data;
  (c) a processor for determining if the entire block has been processed;
  (d) a processor for determining if the entire strip of the output image has been processed, and if not, repeating (b) and (c) for the next horizontal block; and (e) a processor for determining if the entire frame has been processed, and if not, repeating (b) to (d) for the next block in the next strip and resetting said pointers.

Further aspects and advantages of the invention will appear from the following description taken together with the accompanying drawings.

DETAILED DESCRIPTION OF THE INVENTION

Figure 1:
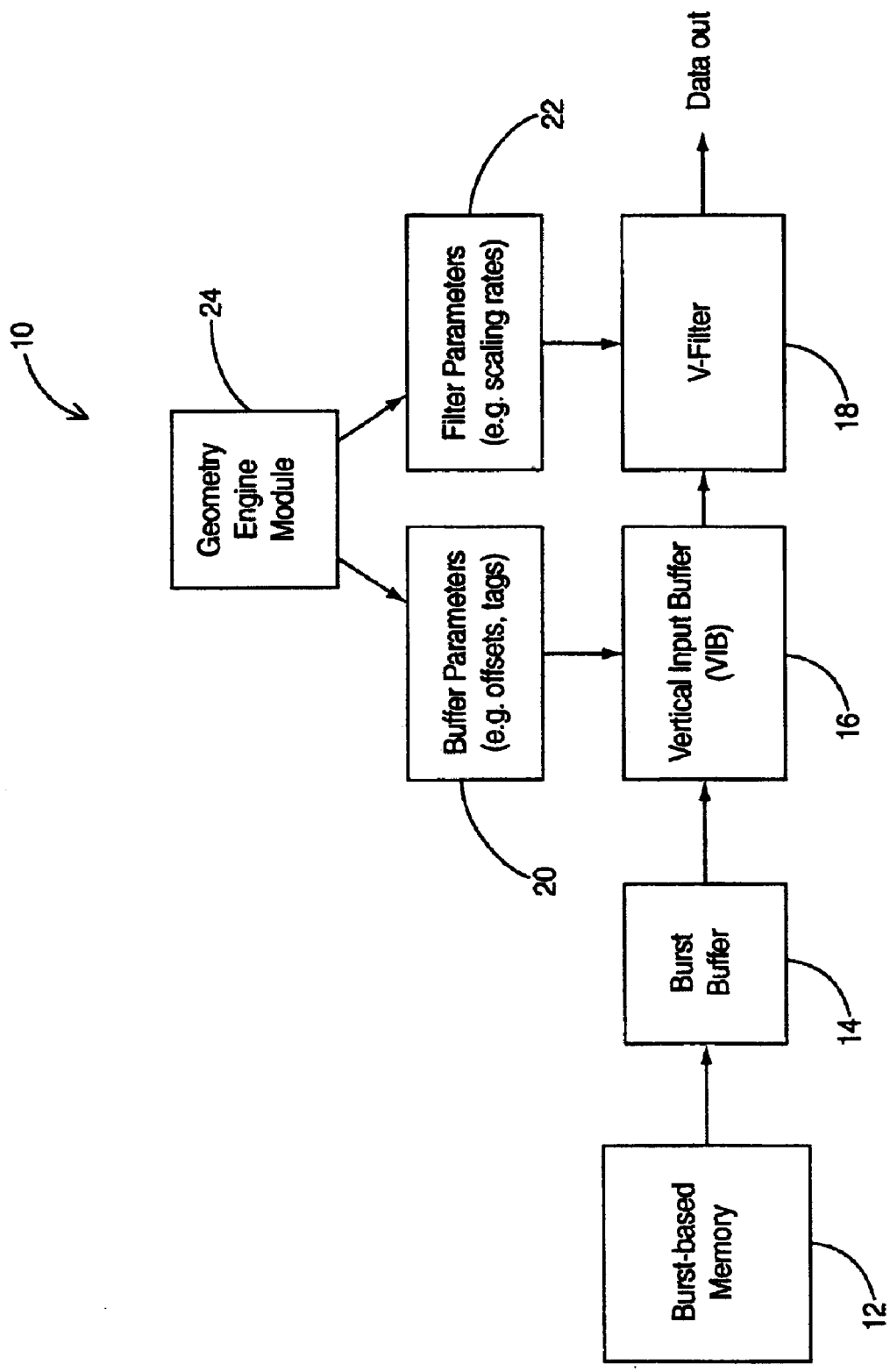
FIG. 1 is a block diagram illustrating the elements of an example data processing system of the present invention.

Referring now to FIG. 1, is a block diagram of an image data processing system 10 made in accordance with a preferred embodiment of the invention. Data processing system 10 contains a burst-based memory 12, a burst buffer 14, a vertical input buffer 16, a vertical filter 18, a buffer parameters module 20, a filter parameters module 22 and a geometry engine module 24.

Burst-based memory 12 is a dense and large external memory store which is accessed in burst mode to achieve the required memory bandwidth efficiency. When memory is operating in burst mode, this is a rapid data transfer technique that generates a block of data whenever a single address is requested, the assumption is that the next data address that will be requested by the processor will be sequential to the previous one. When data is accessed in burst model, it allows for greater efficiency if subsequent data that is requested is in fact sequential to data that has just been requested, as this data has already been read out.

Burst buffer 14 allows the data to be read from burst-based memory 12 as a single burst without concern for efficiently storing the data in the internal circular buffer, which is vertical input buffer 16. The data is read from burst-based memory 12 and written to burst buffer 14 in burst mode. Data is then transferred from the burst buffer 14 to vertical input buffer 16, this is described in further detail below.

Vertical input buffer 16 has its contents read by vertical filter 18 in order to generate the output image. Vertical input buffer 16 provides buffering to compensate for different data rates of vertical filter 18 for accessing data. Vertical input buffer 16 consists of a memory store, one write pointer and in the preferred embodiment 16 read pointers. The memory store in the preferred embodiment is 16 pixels wide (each pixel is 24 bits) by 256 pixels deep. The vertical input buffer 16 for the preferred embodiment is implemented in hardware on an application-specific integrated chip (ASIC) with 16 8 bit vectors for read pointers and one 8 bit vector for a write pointer.

Geometry engines are generally known to perform a set of routines for processing requirements dealing with integrated circuit geometry. Geometry engines are known in the art, an example being the geometry engine used by U.S. Pat. No. 5,594,676. Geometry engine module 24, generates parameters (tags) to be sent to a buffer parameter module 20, in order that buffer parameters module 20 receives information that will be passed on to vertical input buffer 16 to allow for the data to be processed appropriately. Geometry engine module 24 based on its operations is able to determine and pass on where data is to be read from, as well as determining much of the other functionality which vertical input buffer 16 relies upon, which will be described in further detail below.

Buffer parameter module 20, sends parameters regarding offset and tags to vertical input buffer 16. These offsets and tags are generated by geometry engine module 24 as is known in the art. The offset parameter that is received by vertical input buffer 16 will allow for efficient use of resources by requiring vertical input buffer 16 to only store data that it requires for processing. The tags are used to allow the vertical input buffer 16 to manipulate its read and write pointers in certain circumstances, which will be described in further detail below.

Filter parameter module 22, sends parameters such as what the scaling rate the filter should use is. Filter parameter module 22 receives scaling rate and other information that will be passed to vertical filter 16 from geometry engine module 24. The amount of scaling determines the number of pixels that are processed to generate the output image and this directly affects the size of the blocks that all used to process the image. It should be understood that the block sizes used to process the data are not fixed and accordingly can be used and adapted to different sizes as required.

Figure 2:
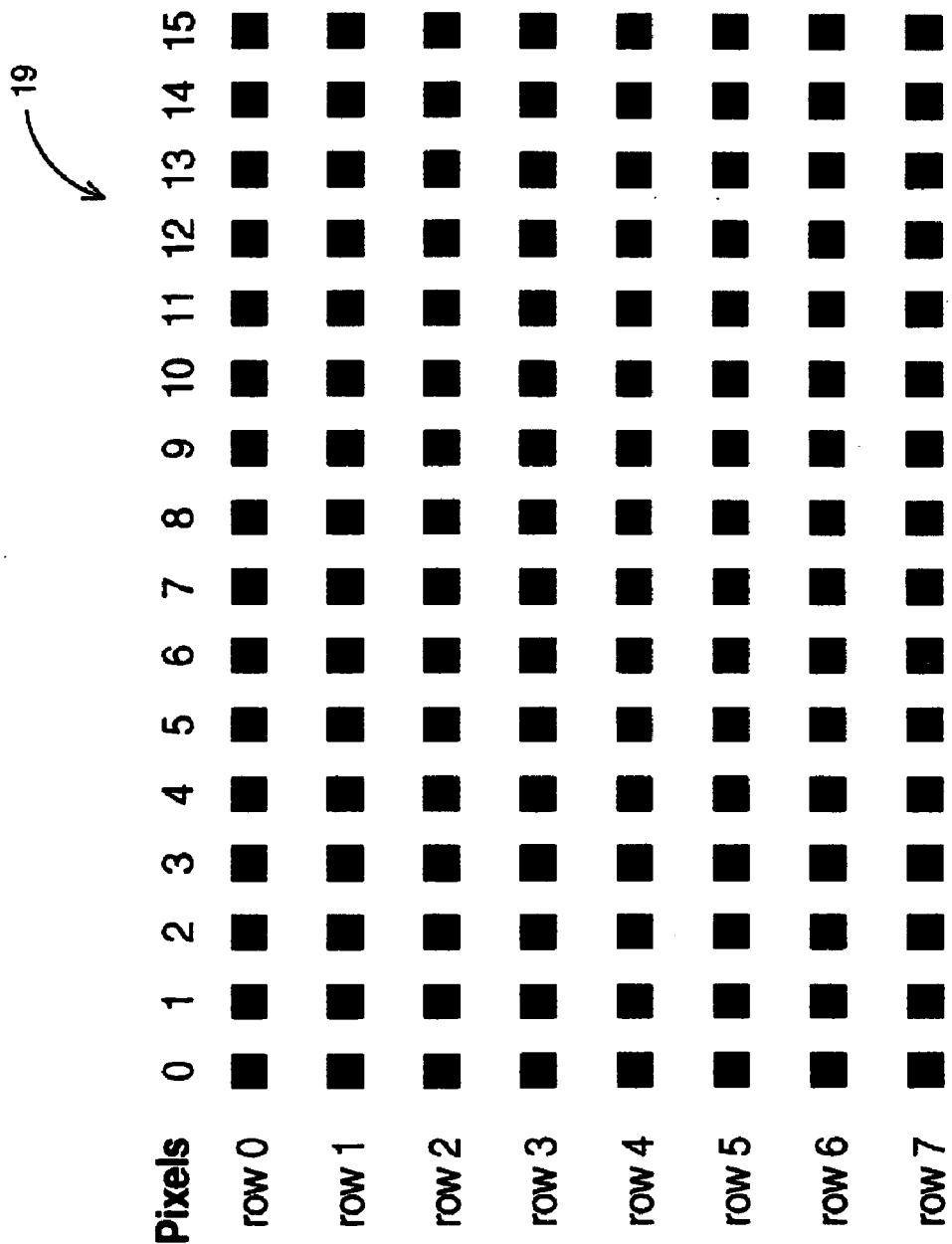
FIG. 2 is a graphical representation of a two dimensional block of data that is being read from memory.

Referring to FIG. 2, is a diagram of a two dimensional block of data 19 in burst-based memory 12. In this figure, the data block is of a limited width, namely, 16 pixels. Each pixel comprises 24 bits, which is data indicating the color intensity of the red, blue and green scalars. Pixels 0 through 15 are read out of burst-based memory 12 in burst mode from row 0 and written to burst buffer 14. This will be followed by pixels 0 through 15 of row 1, followed by subsequent rows of data being written to burst buffer 14.

When data is being written to burst buffer 14, it is done in the same manner as when it was being read out of burst based memory 12, as in pixels 0 through 15 of row 0 will be written into the same row of burst buffer 14, followed by pixels 0 through 15 of row 1 being written into the subsequent row of burst buffer 14. The number of rows of burst-based memory 12 that are read is limited by the size of the buffers which the data is subsequently being written to, as they are of a limited size.

Data is read out of burst-based memory 12 in burst mode into burst buffer 14, thereby allowing burst-based memory 12 to be utilized in its most efficient manner. Burst buffer 14 then transfers data to vertical input buffer 16, which then provides access to the data as required by the system. Burst buffer 14 is able to transmit data to vertical input buffer 16 in a column by column format as well, however in the preferred embodiment the data is transferred in a row by row format. The buffered data in vertical input buffer 16 is accessed in the preferred embodiment in column order as required for vertical filtering.

Figure 3:
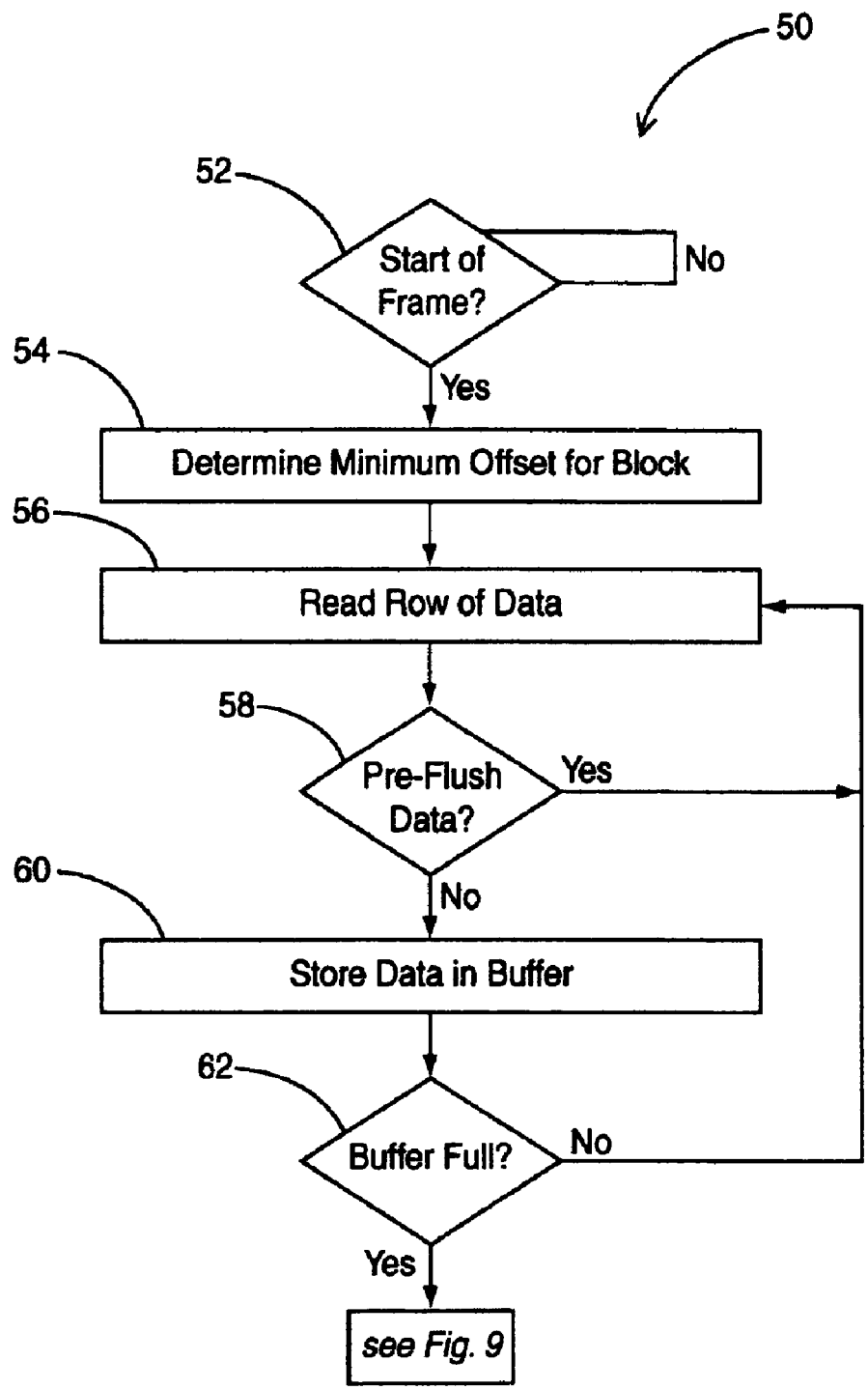
FIG. 3 is a general flowchart representation of the buffer control logic for the preferred embodiment.

Referring now to FIG. 3, a detailed flowchart diagram that illustrates part of the buffer control logic for vertical input buffer 16 for the optimized processing of data method 50 is shown. The initial steps of the method are illustrated in FIG. 3, as discussed below.

At step (52) it is determined whether a new frame of data is being sent from burst buffer 14. A frame comprises a series of blocks that need to be processed so that in turn, an image can be generated. This determination is made by receiving a tags as determined by geometry engine module 24 which is passed on through buffer parameters module 20, methods for determination of whether a new frame is being processed are known in the art. At step (54), the minimum offset is determined by receiving parameter data from buffer parameters module 20 which has been received from geometry engine module 24.

It is necessary to determine what the offset for this frame of data would be, namely how many lines (rows) of data that are received that need a to be "skinned".

This allows for the processing engines (i.e. filter) to be designed in such a manner that it may process all data it receives and thus reducing its control complexity, and none of its resources are wasted processing data that is invalid input data.

At step (56) a row of data is read in, and at step (58) the pre-flush data check determines whether this row of data is required for processing or whether it should be skipped. This is determined by making use of the offset information from step (54). If the row of data that has been read in by step (56), is to be kept, then the data is written to a row of vertical input buffer 16. If the row of data that is read at step (56) is not required, as in it needs to be "skipped", then that row of data is not written to vertical input buffer 16 in step (60). The next row of data is then read from the burst buffer by step (56). This reading of rows of data and checking of whether they are to be stored in vertical input buffer 16 is undertaken until the buffer is full, which is determined by step (62). After a row of data has been read and written into vertical input buffer 16, the read and write pointers are manipulated to account for the new data that has been written.

Figure 9:
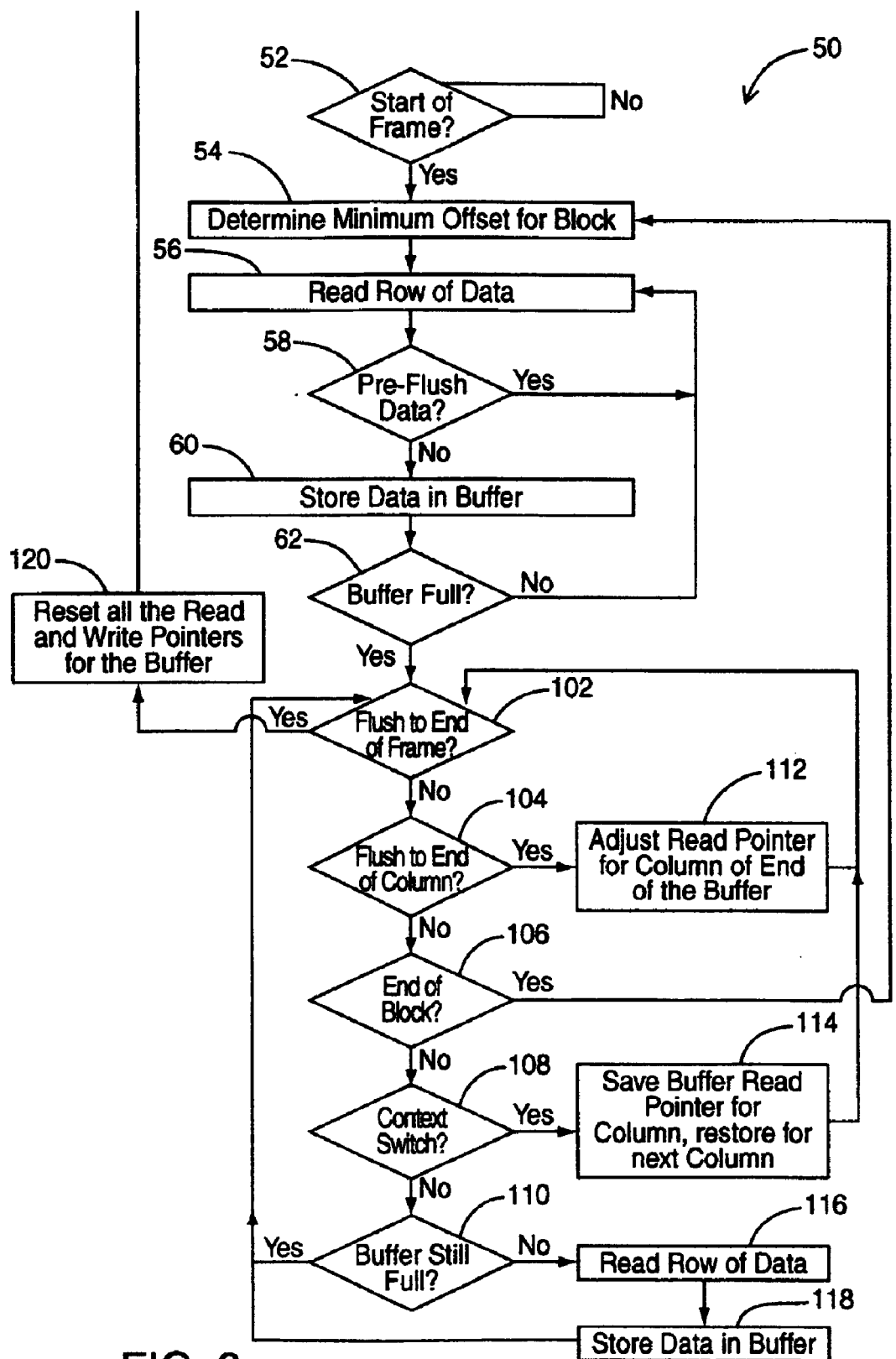
FIG. 9 is a more detailed flowchart illustrating the steps of the buffer control logic of FIG. 1.

FIG. 9, which is described further on is the logic of optimized processing of data method 50 with regards to the operation of vertical input buffer 16 for when data from it is being processed. It relies on the steps that have been described in FIG. 3 as well.

Figure 4:
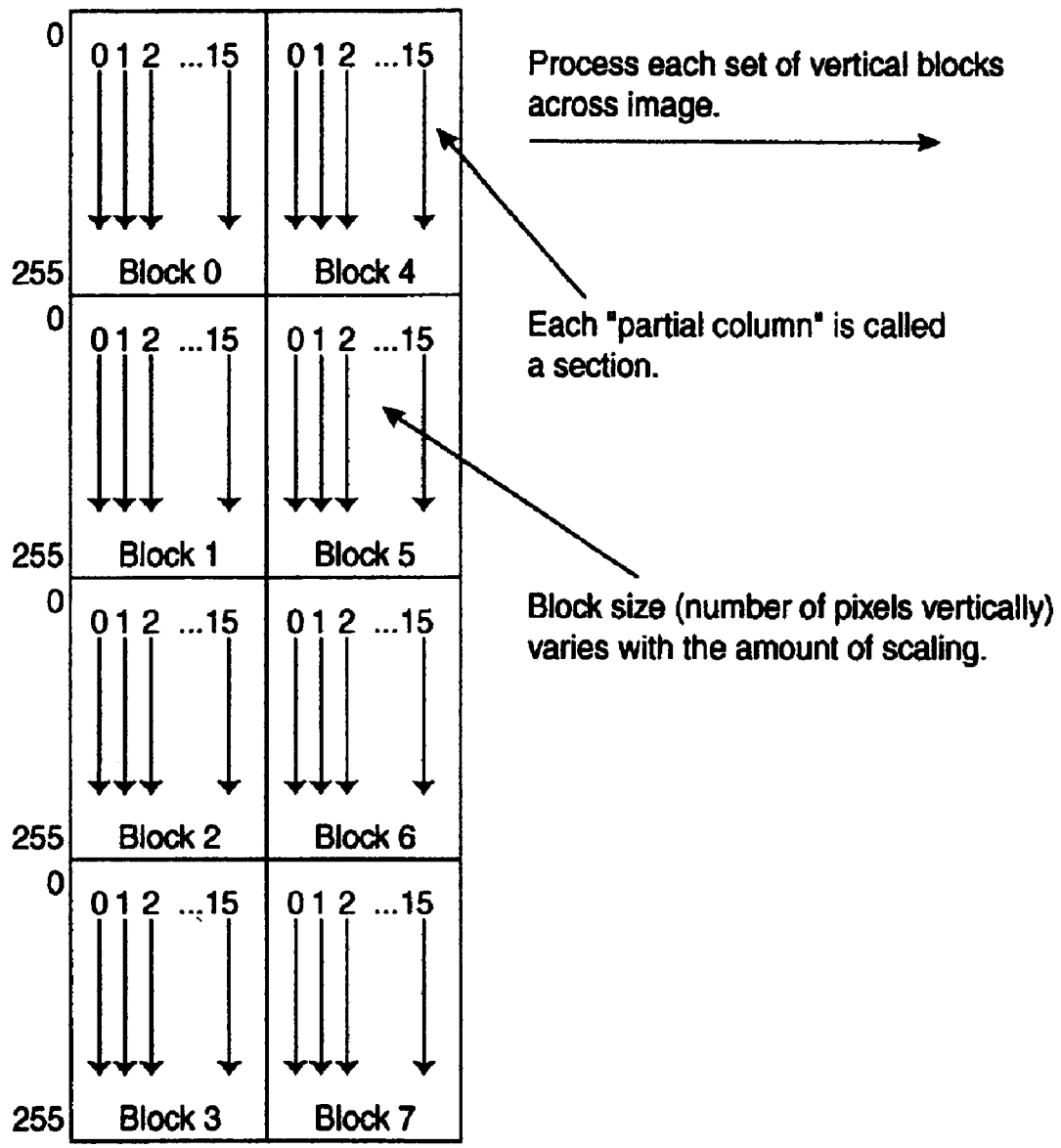
FIG. 4 is a schematic diagram illustrating the order of block processing of the data for the preferred embodiment.

Referring now to FIG. 4, block processing diagram is shown illustrating an image that has been broken into two dimensional blocks for processing. Each two-dimensional block in this example has a width of 16 pixels. Block 0 is processed (has had its output pixels generated) followed by Blocks 1, 2, and 3 respectively with regards to this example. Blocks 4, 5, 6, and 7 respectively will then be processed next and so on, until the data for the entire image has been processed. The number of blocks in a column of a frame depends on the scaling and size of input images to be processed. By changing the size of the blocks, different degrees of scaling and different amounts of pixel displacement from the input image to the output image are supported. The order of processing of the blocks in this manner is referred to as vertical display low latency mode, as the image that is being generated is being done so from top down and then across a frame.

It is required that vertical input buffer 16 store at least the amount of data required to generate (i.e. filter) the output pixels for the entire block. All the data required for a block must be present in vertical input buffer 16 at the same time. The rationale behind this is that the output pixels are generated on a block-by-block basis, so an entire block must be processed before the processing of a new block is begun. All pixels that are required for the current block being processed must be in vertical input buffer 16 so as to generate the output pixels. It is imperative for vertical input buffer 16 to be large enough to store all the data of a block, so that the vertical filter can process the data and generate the output pixels for that respective block. If this can not be done, then vertical filter 18 will not have all the data that is required to generate the output pixels which would result in it being stalled. The end processed data from the vertical filter must appear as if the data was processed as a continuous stream. However, due to the block processing, the output pixels are generated in short segments where the segment length is equal to the block size. The vertical input buffer 16 must be large enough to store all the data for each segment that is being generated. As a result, the number of pixels that are being generated (i.e. the block size) and the amount of scaling required dictate how the large vertical input buffer 16 needs to be. Optimized processing of data method 50 allows the block sizes to be increased or decreased depending on the scale factor (i.e. the warp being generated) while maintaining the same size for vertical input buffer 16. This is very important for image warping applications where the amount of scaling can vary a great deal, an example being scaling amounts between $\frac{1}{32}$ to 32.

The amount of scaling determines the number of input pixels that are processed to generate the output image. This variation in turn causes a choice of block sizes. Ideally the maximum block size would be processed to minimize the overhead of switching between partial columns (columns of a block) that are being processed. The amount of data that is required for the output pixels may be variable across the image. The amount of data processed in each block depends on the processing being applied by vertical filter 18. For example, if vertical filter 18 is scaling the image, then the amount of data used to generate the output pixel depends on the amount of scaling being applied. Therefore, if variable scaling is applied across the image, then the amount of data processed varies across the image. Any variation in scaling accumulates as the scaling is performed down the entire column. In addition to the amount of scaling, the movement of pixels from where they are in the input image to where they are in the output image also means that the pixels that are needed to generate the output image varies from column to column. The variable processing rate and the amount of pixel movement accumulate to create a variation in the location of the pixels that are required to generate the output image.

There are a number of issues surrounding the efficient storage of the data received from burst-based memory 12. Since a small random access buffer, which here is vertical input buffer 16, is used to store a subset of a larger burst memory, there are two major problems to be solved with respect to the small random access buffer. One is to efficiently store the correct "subset" of the larger data store. The other problem is to maintain a way for the processing engine, which here is vertical filter 18, to pick up the correct data for processing.

The standard approach to buffering data is to provide "dumb" buffers that simply provide random access to the data. Typically, the processing engine maintains the logic required to keep track of which data is required for processing. This is inefficient since the buffer is required to store all that data since it does not know which data is required. As a result, the buffer is either very large, or does not necessarily contain the data that is required for processing.

In optimized processing of data method 50, by making the input buffers "intelligent", the above problems can be resolved and further processing logic can also be simplified since it can be designed as if the data is flowing continuously to vertical filter 18. Optimized processing of data method 50 makes use of read and write pointers to make the buffers "intelligent". A read pointer is maintained for each column of vertical input buffer 16 as well as a write pointer 92. The read and write pointers are used to indicate where to read from and where to write to inside vertical input buffer 16. As data is being read into and out of vertical input buffer 16, it is necessary to have the ability to move the read data pointers around inside the input buffer.

Figure 5:
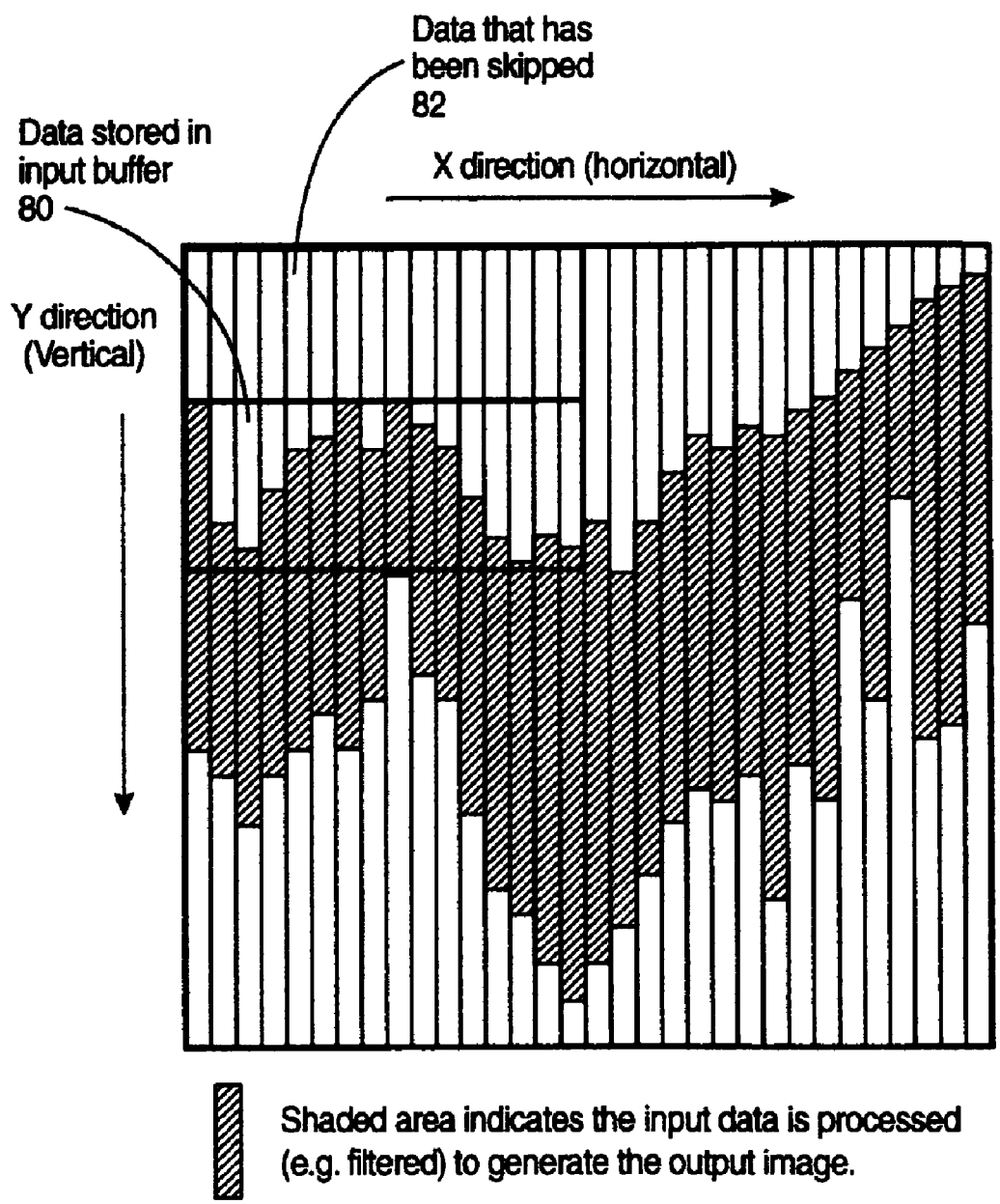
FIG. 5 is a schematic diagram depicting the position of data that is to be stored for processing.

Referring now to FIG. 5, there is shown an example snap shot of a section of an input image to be processed. The snapshot illustrates that the amount and position of the data required for vertical processing (filtering) of the two-dimensional data varies depending upon the column. The invention buffers these image pixels that are seen in a data stored in input buffer 80 in vertical input buffer 16. A read pointer for each of the columns is maintained so that the correct data is passed to the vertical filter 18.

This data that is contained in a data that has been skipped block 82, has had its data read from burst buffer 14 (where it was temporarily being stored after having been read in from burst-based memory 12 as described above), and been sent to vertical input buffer 16, where the pre-flush data check at step (58) of optimized processing of data method 50 (as detailed in FIG. 3) determines that this data is not needed for processing based upon the parameters generated from geometry engine module 24. Buffer parameters module 20 had sent offset information to vertical input buffer 16, so that the logic controlling vertical input buffer 16 knows to drop u unneeded rows of data before receiving a row of data that is to be written to vertical input buffer 16. The first row of data that is not to be skipped in this figure, is the top row of data within block 80, as all the rows prior to this one were skipped as no data there was required for processing.

Figure 6:
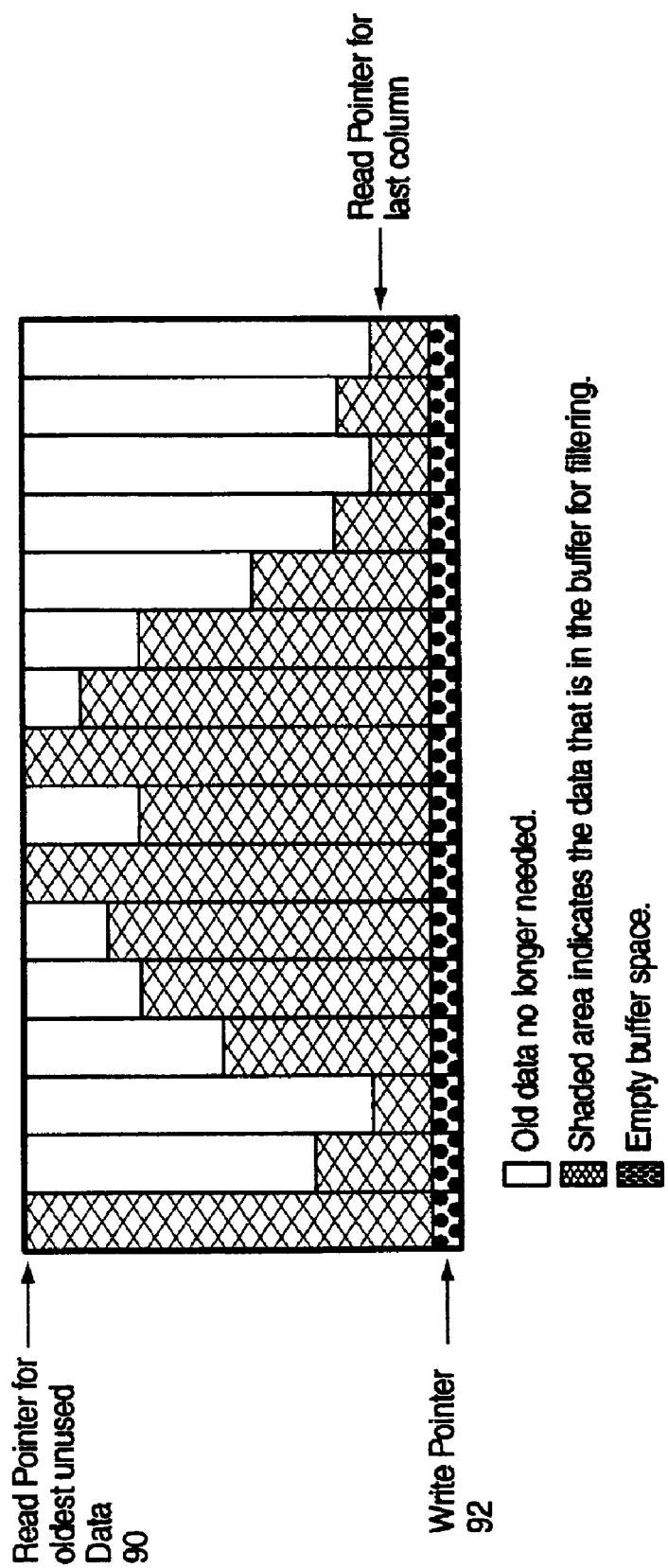
FIG. 6 is a schematic diagram depicting the contents and pointers of the vertical input buffer employed in the preferred embodiment.

Referring now to FIG. 6, there is shown data that is stored in vertical input buffer 16. This figure shows the read and write pointers of optimized processing of data method 50. Vertical input buffer 16 consists of a memory store, one write pointer 92 and preferably 16 read pointers. The memory store is 16 pixels wide (each pixel is 24 bits) by 256 pixels deep in the preferred embodiment. Vertical input buffer 16 is implemented in hardware on an ASIC chip with one 8 bit vector for a write pointer and in the preferred embodiment 16 8 bit read pointers. There are as many read pointers as there are columns, a write pointer 92 and a read pointer for oldest unused data 90 which keep tracks of the oldest unused data. Read pointer for oldest unused data 90 is important as it points to the location where there remains data that has to be read, this way the logic is able to compare the positions of read pointer for oldest unused data 90 and write pointer 92 so as to determine whether the buffer is full or empty. Read pointers for each column allow each column to be processed independently by vertical filter 18. It is necessary for only one write pointer to be maintained. Write pointer 92 points to the next position in vertical input buffer 16 in which the next row of data will be written.

When vertical input buffer 16 is initialized at power up, the buffer is deemed to be empty as read pointer for oldest unused data 90 and write pointer 92 point to the same location in memory, namely the first row of vertical input buffer 16. The logic which controls vertical input buffer 16 determines that vertical input buffer 16 is full when there is just one location left to write to. If vertical input buffer 16 is written to in this state where only one location is left to be written to, then after doing so, write pointer 92 will have been incremented so that the read pointer for oldest unused data 90 and write pointer 92 would point to the same location, which would be the same condition that is used to determine when vertical input buffer 16 is empty. It should be understood that the number of read pointers is dependent on the number of columns of vertical input buffer 16, which is application specific. For example, if it was required that vertical input buffer have 24 columns, then this would require 24 read pointers.

A vertical input buffer 16 with 16 columns has been used for illustrative purposes, and can be designed so as to have however many columns that are required. It should also be noted that other methods may be employed so as to determine whether vertical input buffer 16 is full or empty. For example a separate flag could be used to indicate if the circular input buffer is full or empty, as opposed to simply using the read and write pointers.

Referring to FIG. 6, it is shown that minimum read pointer for oldest unused data 90 is at the start of vertical input buffer 16. Write pointer 92 is at the end of vertical input buffer 16. The shaded area of the figure indicates data that is in the buffer that needs to be processed. The area that is represented as non shaded or white in the snap shot is old data that is no longer needed. The read pointers and write pointer 92 for the vertical input buffer 16 are updated as the output image is being generated (which happens when vertical input buffer 16 has its data accessed by vertical filter 18). Since vertical input buffer 16 acts as a circular buffer, the read and write pointer 92 will naturally wrap around from the beginning to the end of it. As a result of maintaining a read pointer for each column, 16 buffers each representing a column of data have been created. As a result, vertical input buffer 16 is able to handle the different data rate requirements of each column that is being accessed by vertical filter 18, and in turn able to more efficiently utilize the data that has been read out of burst-based memory 12 in burst mode.

Figure 7:
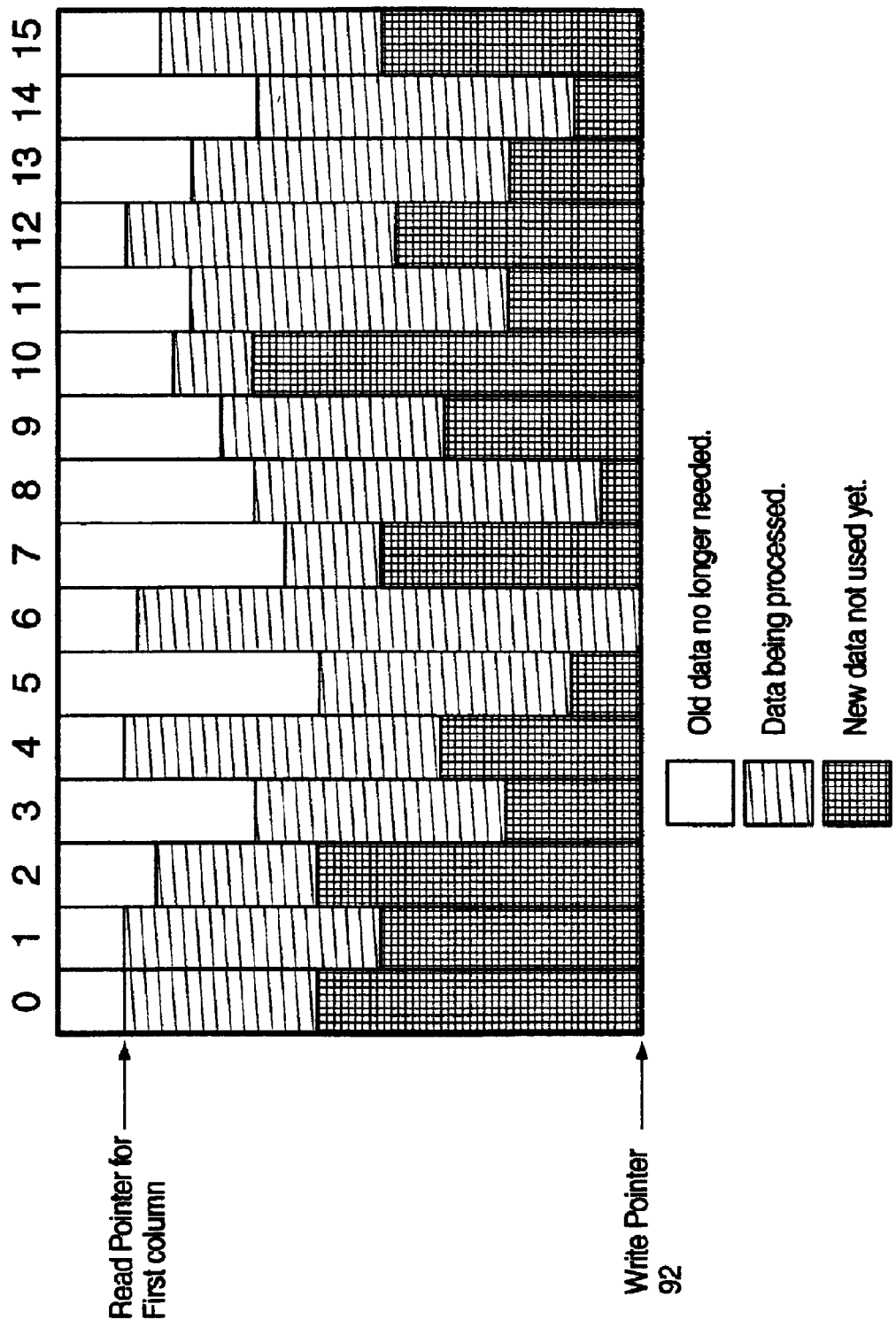
FIG. 7 is a schematic diagram depicting in more detail data within the vertical input buffer employed in the preferred embodiment.

Referring now to FIG. 7, a vertical input buffer 16 which has data stored in it that is being accessed for processing is shown. Each column has data within it which is being processed. The non-shaded areas in the vertical input buffer represent areas that contain data that is no longer needed and it may be overwritten by new data that is being read in. This way the write pointer 92 can wrap around and write data to the top row of the vertical input buffer while data that needs to be accessed for processing is still present.

Vertical filter 18 filters the partial columns of data that are represented in FIG. 4 and that are accessed from vertical input buffer 16 employing filtering techniques which are known in the art. Vertical filtering requires the data of an entire column to be processed. As the data is being read out of burst-based memory 12 in burst mode, if the vertical filter would filter the data for the partial column represented by this memory that is read out, this would result in the efficient use of the bursts from burst-based memory 12. Data processing system 10 allows for partial processing of columns to generate images for this vertical low latency mode, without requiring the re-reading of data from other parts of the column which would be in other blocks.

Vertical filter 18 has the functionality to allow it to be stopped and restarted. Referring again to FIG. 4, for example, after filtering column 0 of block 0, column 1 of block 0 is then processed. When column 0 of block 1 needs to be processed this requires the data from filtering of column 1 of block 0. Stopping and re-starting in this context is simply referring to the ability of the filter for when filtering partial columns to simply pick up where it left off with respect to the partial column it is now processing as because of what it has stored with regards to the processing of parts of the same column for the block located directly above the current one. Not requiring re-reading of data is referring to the functionality that vertical filter 18 has to store in a context memory 84 data from its processing of partial columns so that it is not necessary to re-read this data when subsequent blocks are processed. Without this functionality, the data would have to be read again at the start of the next block being processed. This re-reading of the data is inefficient and does not allow for simple independent block processing of the data. The vertical filter 18 must store its intermediate parameters so that it can switch between columns. In the preferred embodiment the number of bits of data that must be saved to the context memory is approximately 150 bits of data per context.

Referring again to FIG. 4, as an example, when column 2 of block 1 is being processed by vertical filter 18 it requires data of column 2 for block 0, as the filtering that is being done is being done by employing data of previous pixels (in a vertical manner). Typically, it is required that this previous pixel information for a column be re-read from memory. With vertical filter 18 saving the previous pixel information, re-reading is not required. As vertical filter 18 will access the previous pixel information from its context memory 84, this will allow for it to efficiently process partial columns of data as re-reading of data from previous blocks is not required and this results in greater efficiency in terms of what is required to be stored in vertical input buffer 16 at any one time.

Figure 8:
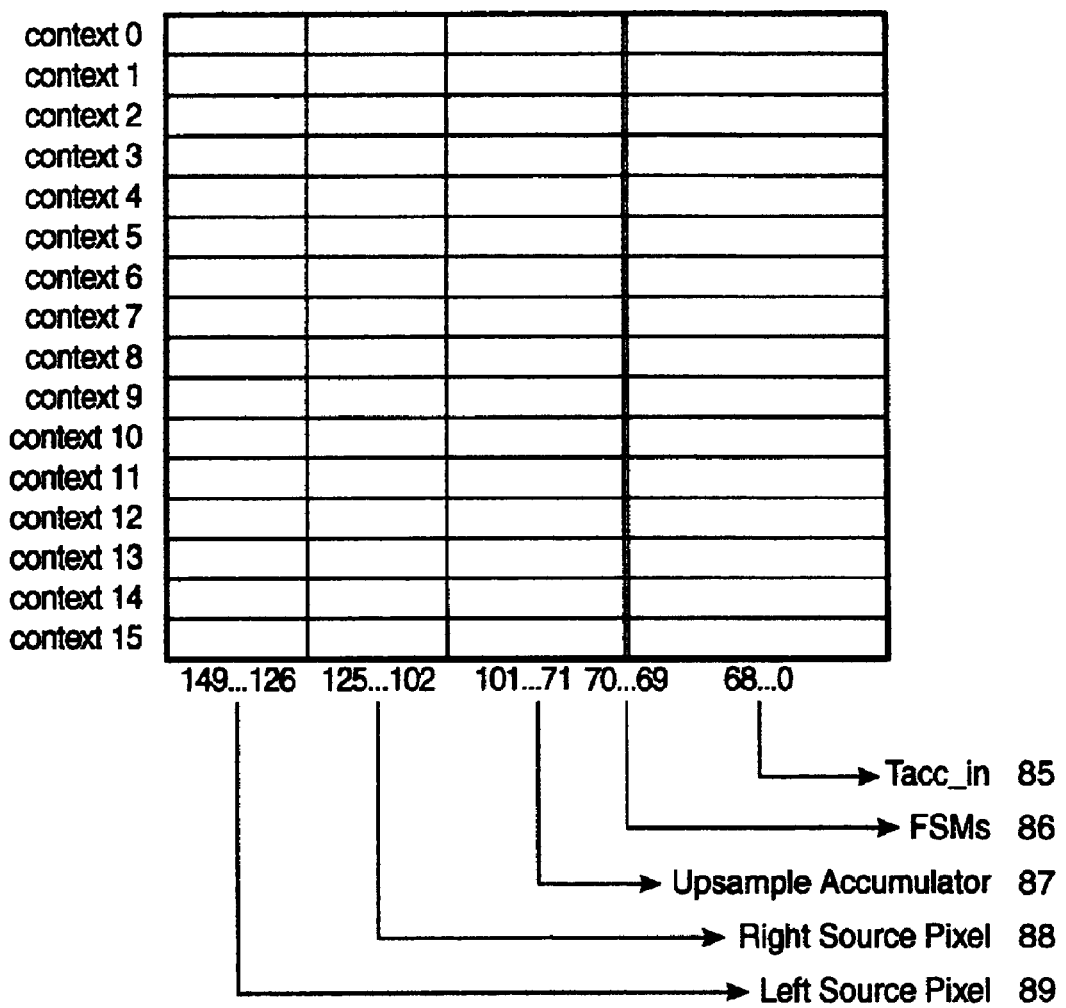
FIG. 8 is a schematic diagram of the context memory that is employed by the vertical filter of the preferred embodiment.

Referring now to FIG. 8, is a representation of the context memory 84 that the vertical filter 18 employs. The logic by which context memory 84 is able to store data that will result in it not needing to re-read information is described in further detail below. The context memory is not limited to 150 bits per context, this is application specific and can be adapted depending on the needs of a particular application. Context memory 84 is broken up into 4 areas. Bits 0–68 are used for a Tacc__in 85 data. Tacc__in 85 is data that stores the partially generated output pixel. Bits 69–70 are used to store in a FSMs 86 the finite state machine number of the filter, which will allow the filter to restart. Bits 71–101 are used to store data for a Upsample Accumulator 87, which is the sum of the pixel displacement (from input to output) increments. The sum of the displacement increments gives the pixel position in the image space. Bits 102–125 and 126–149 which are labeled a Right Source Pixel 88 and a Left Source Pixel 89 respectively, are used to store the last pixels (as it is 24 bits) that were used by vertical filer 18.

Referring now to FIG. 9, it is shown a complete flowchart of optimized processing of data method 50. Steps (52), (54), (56), (58), (60), and (62) have been described in FIG. 3. It should be noted that for the sake of simplicity the method by which the filter accesses the data of vertical input buffer 16 is not included, what has been included is the description of the way in which optimized processing of data method 50 deals with vertical input buffer 16. After step (62) determines that the buffer is full, step (102) will determine whether a flush to the end of frame should be carried out. This will be the case where the data for an entire frame has been processed, as will be determined by the geometry engine module 24 which will send the appropriate tag through buffer parameters module 20 to vertical input buffer 16. The data of a frame has been processed when the all the blocks that make up a frame have been processed. If an entire frame (blocks that comprise an image) has been processed, step (120) will reset all the pointers to be prepared for processing that will be done for the data of a subsequent frame. If step (102) determines that the data of an entire frame has not been handled, step (104) determines whether the data of a column should be flushed. This will be the case where the geometry engine module 24 sends a tag to buffer parameter module 20 to pass on to vertical input buffer 16 indicating that the output pixels for the entire column (not just partial columns as when dealing with blocks) have been generated.

The flush to the end of column is done by simply adjusting the read pointer for that column to point to the end of that respective column in step (112), as well as adjusting read pointer for oldest unused data 90. Step (106) determines whether an entire block has been processed. If an entire block of data has been processed the method proceeds to step (54) so that it may receive information regarding the offset for the next block of data that is being processed. If step (106) determines that an entire block has not been processed, then step (108) determines if a context switch is in order. The context switch is done after a partial column of data has been processed (the column of a block) and is determined by geometry engine module 24. A context switch allows vertical filter 18 to switch to the next column. If a context switch is in order, then step (114) will save appropriate information from the processing of the partial column to context memory 84 of vertical filter 18 to ensure that re-reading of data would not be required when subsequent blocks of data are processed. This allows for greater system efficiency as data does not need to be re-read. If step (108) determines that a context switch is not in order, and step (110) determines that the buffer is not full then another row of data is read in step (116) and stored in the buffer in step (118).

Referring now to FIG. 10, an example of pointer initialization and manipulation during image processing is shown. FIG. 10(*a*) indicates input data that needs to be processed (e.g. filtered) in order to generate the output image. The shaded area is the area that needs to be processed. FIG. 10(*b*) shows a region at the top of the figure which has been "skipped", i.e. not stored in the input buffer, as it does not contain input data that needs to be processed. FIG. 10(*c*) illustrates how vertical input buffer 16 is filled based upon its capacity. The amount of data that is initially read into it may not be all the data that is required to generate the image for that block, as it is necessary for the entire block of data for a block to be in vertical input buffer 16 at once for it to be processed. The checkered area of FIG. 10(c) illustrates an area of the input required that has not been read in to vertical input buffer 16 due to the capacity of the buffer.

Figure 10A:
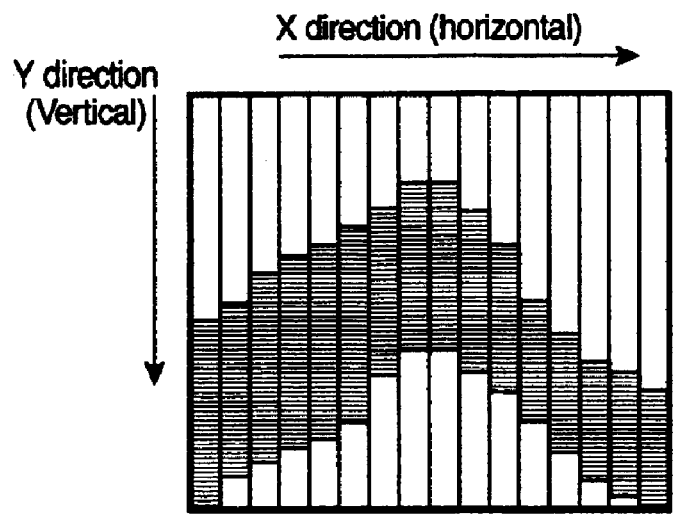
FIGS. 10A to 10K is a series of schematic diagrams illustrating the pointer manipulation of the vertical input buffer of the preferred embodiment.
Figure 10B:
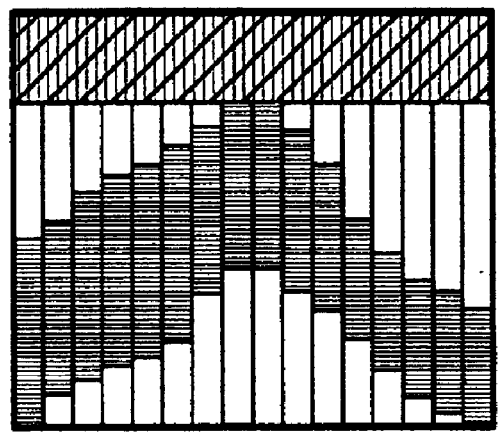
Figure 10C:
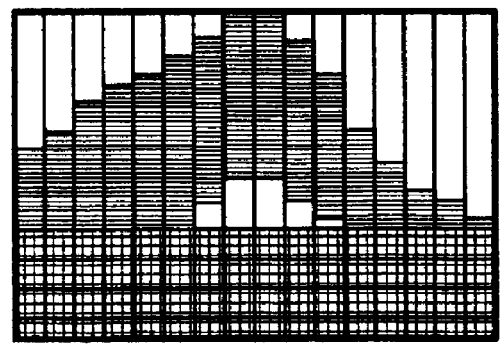
Figure 10D:
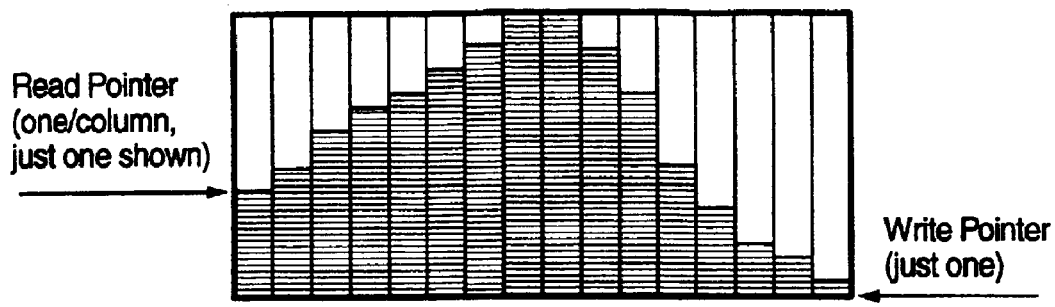
Figure 10E:
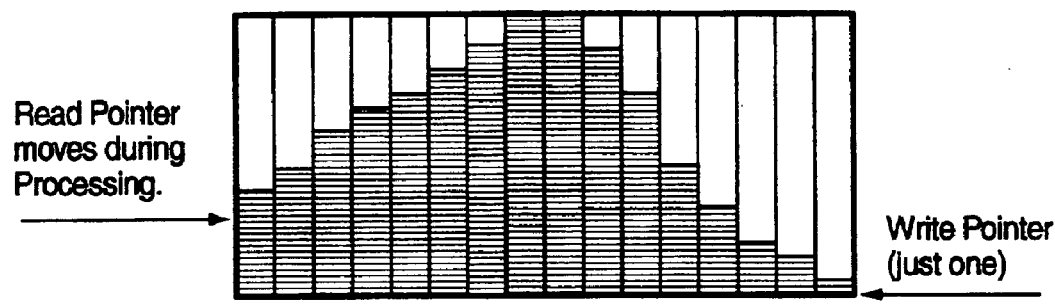
Figure 10F:
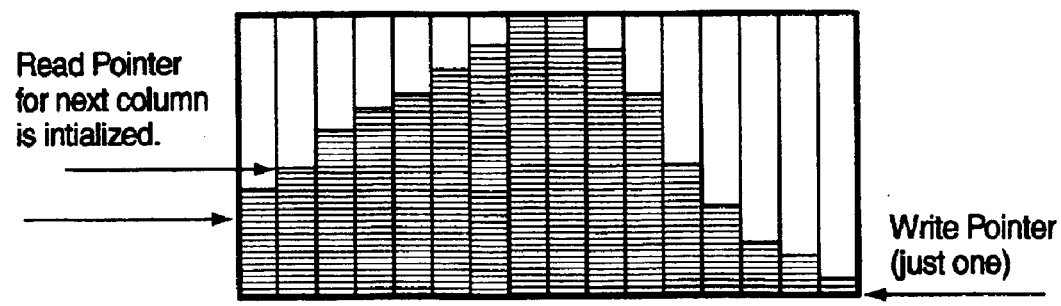

FIG. 10(d) illustrates how the read pointers are initialized. The figure shows just one read pointer, however as stated before there is one read pointer for each column. Write pointer 90 of which there is just one, points to the next row in vertical input buffer 16 in which data can be written to. The data is accessed for processing column by column, beginning with the leftmost column. FIG. 10(e) illustrates how the read pointer moves down the column as input data is processed. As stated previously, the number of pixels that are to be processed for each column is determined by the programmable block size and the scaling applied. FIG. 10(f) illustrates generally how once the first section of the first column has been processed, a context switch tag is issued by geometry engine module 24 and acted upon by step (110) in optimized processing of data method 50, this allows for the read pointer of the next column to be initialized based upon the offset information as was determined for the first column. This way the filter is able to determine where to read from.

Figure 10G:
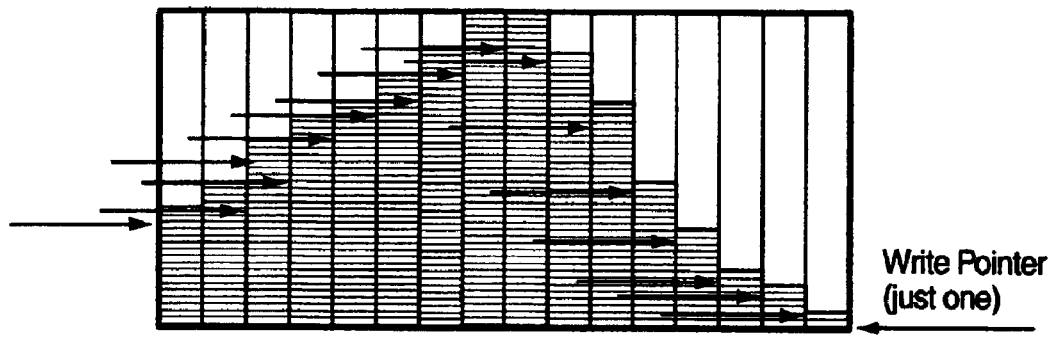
Figure 10H:
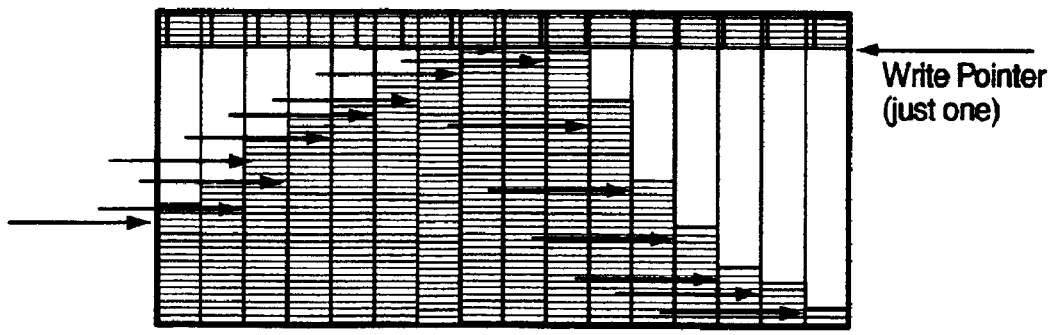

FIG. 10(g) shows how each column is processed until all the columns have been processed, the figure also indicates how the position of the read pointer will vary from column to column based upon the data that was read in and stored in the buffer. Once all the columns have been processed and the read pointer of the last column has been updated, it can be determined by the difference between the read pointer for oldest unused data 90 and write pointer 92 that there is space available in vertical input buffer 16. If rows can be written to in vertical input buffer 16, then rows of data are written to it, and write pointer 90 illustrates this in FIG. 10(h). The top of FIG. 10(h) illustrates this idea with the checkered area. This represents data that has been written in to vertical input buffer 16, with the write pointer 90 having wrapped around to the top of vertical input buffer 16.

Figure 10I:
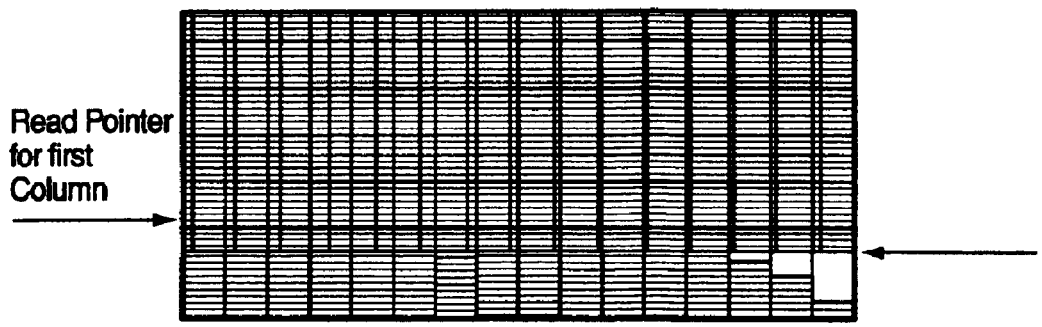
Figure 10J:
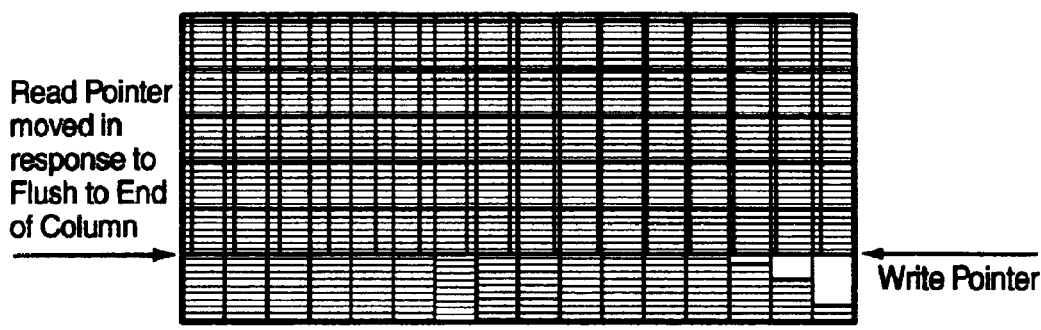
Figure 10K:
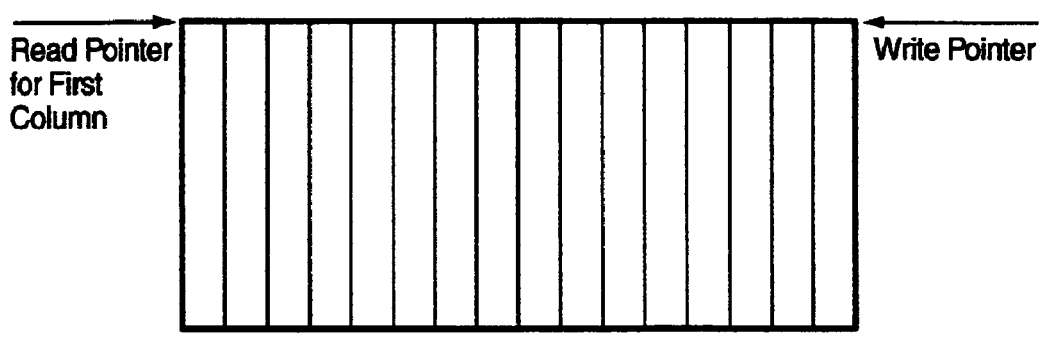

FIG. 10(i) illustrates how this process continues, and the new data that is shown in the checkered area is being shown to write over the previous data that is no longer required. FIG. 10(j) illustrates the operation of a pointer if a flush to end of column tag is issued. A flush to end of column tag is issued as described above when all the pixels of an entire column have been generated, as a result the read pointer for the column is simply moved down. FIG. 10(k) illustrates a buffer that has received a flush to end of frame tag which causes the read and write pointer to be reset. The flush to end of frame tag is issued by the geometry engine module when all the columns for a frame have been processed. As a result, the buffer is in the empty state, awaiting data for a new frame.

It should be understood that the optimized data processing system is not limited to the case whereby the columns are completely processed before switching to the next column horizontally. By switching to the next column before completely processing the current column, the system is able to generate the output horizontally. This allows for output to appear before the complete column has been generated. This reduces the amount of memory required and the processing latency of the system.

Figure 11:
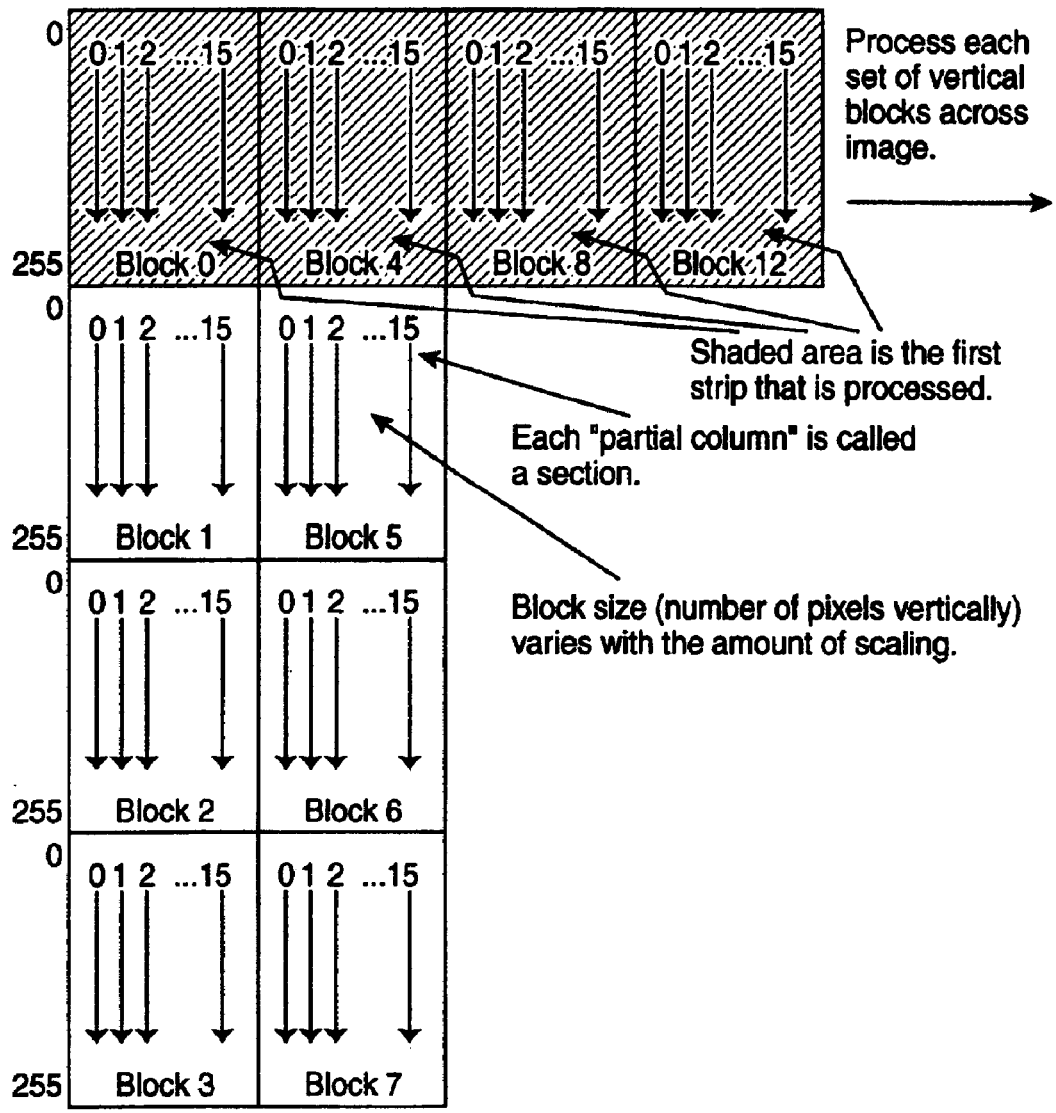
FIG. 11 is a diagram that illustrates the order of block processing of the data for the alternative embodiment.

Referring now to FIG. 11, a diagram depicting the block processing order of the alternative embodiment is shown. The alternative embodiment is a low-latency processing mode where the processing latency (delay) through the system is minimized. Blocks that comprise part of a frame horizontally are deemed to be a strip. Blocks 0, 4, 8, and 12 will have their columns processed before the columns of block 1 are processed in this embodiment. This will allow for output to be generated horizontally across a frame, and in turn allows for output to appear before the data for an entire column has been processed. As the last column of block 12 is processed in this example, the first column of block 1 will be processed. The strip that block 1 is a part of will be processed before the strip that block 2 is a part of.

Figure 12:
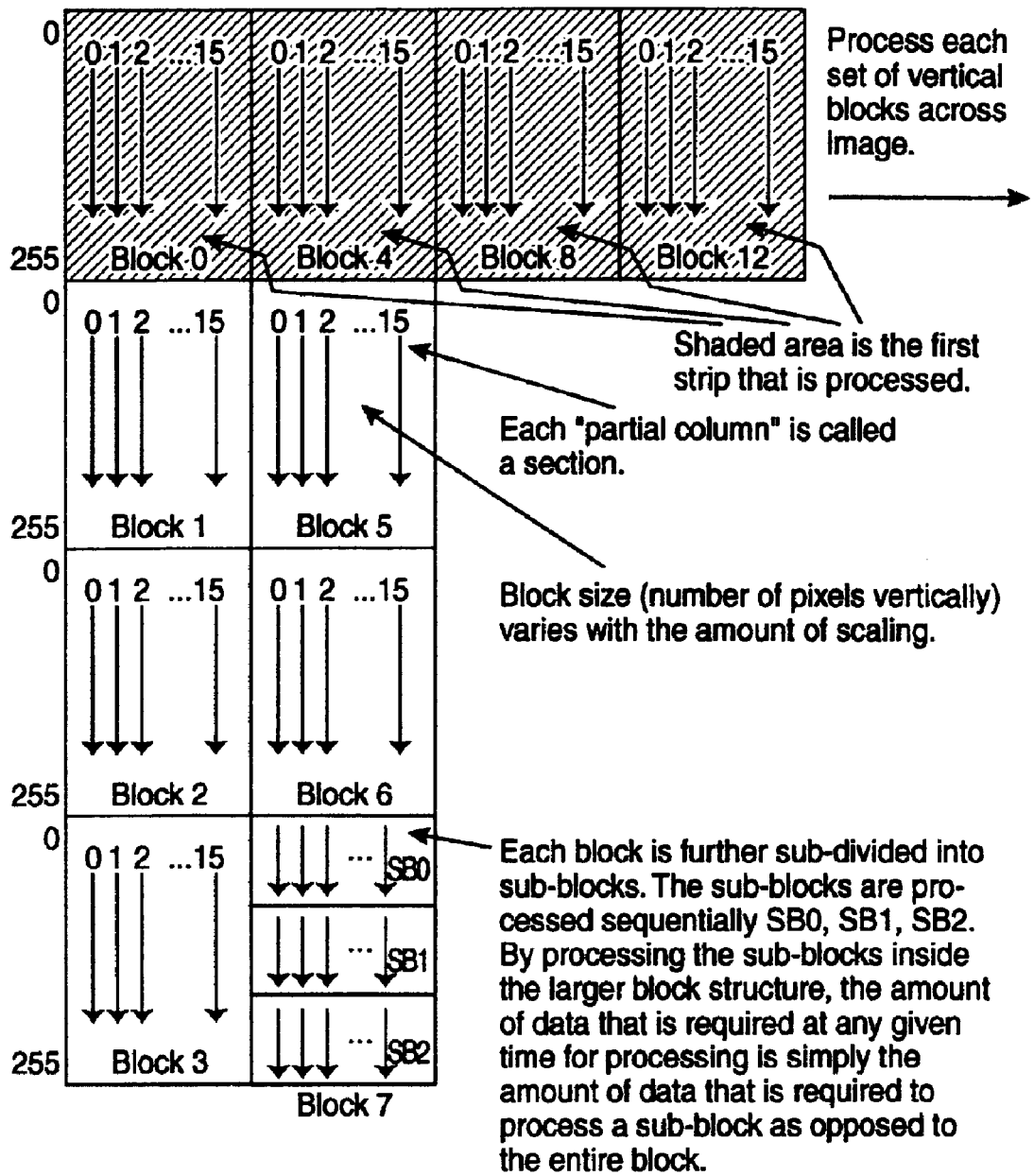
FIG. 12 is a schematic diagram that illustrates the sub-block processing of the alternative embodiment.

Referring now to FIG. 12, a diagram illustrating the sub-block processing method of the alternative embodiment is shown. Each block is further divided into sub-blocks. In the figure, block 7 is further subdivided into 3 sub blocks. The sub-blocks are processed sequentially. With respect to block 7 the order of sub-block processing would be sub-block 0, 1 and 2 respectively. By dividing the larger block structures into sub-blocks, and then processing each sub-block, the amount of data that is required at any given time for processing is simply the amount of data that is required to process a sub-block as opposed to the entire block. Re-reading of data is a consideration with this embodiment, as because the output is being generated horizontally, it would not be efficient in terms of memory storage to employ a context memory 84 as was done in the preferred embodiment, as it would result in partial column data of all the columns of a frame to be stored in context memory 84. The block size (which is the height of the strip), in this embodiment, is to be adjusted as it is a programmable feature of the system so as to reduce the amount of re-reading of data without increasing the buffer size since the sub-block size can be adjusted independently of the strip height. This, therefore, in turn allows for a constant buffer size to support a wide range of input image warps where the amount of scaling and the input pixel positions vary widely across the warp map.

Figure 13:
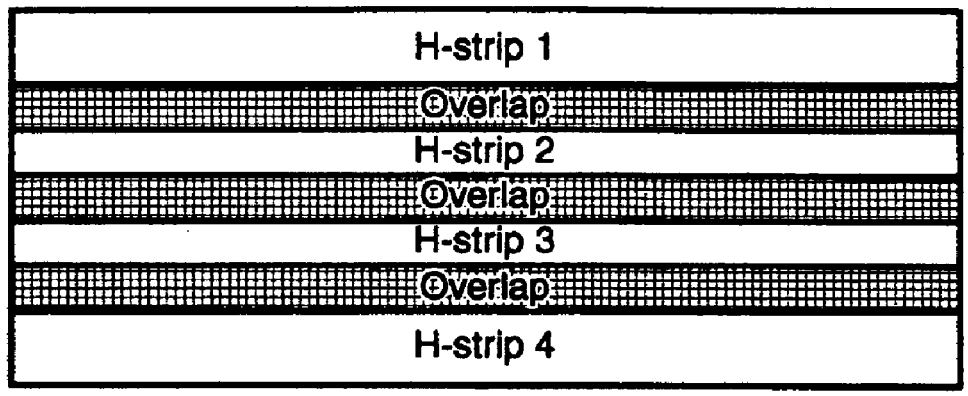
FIG. 13 is a schematic diagram showing the re-reading of data that may be required in the alternative embodiment.

Referring now to FIG. 13, a diagram showing generally the overlap of data that is needed to produce the image, in turn illustrating the need for sub-block processing which reduces the re-reading which is indicated in the figure by overlaps is shown. The overlap strips which are in gray in the diagram represent generally the amount of data that must be re-read between the processing of horizontal strips. As more data is re-read this has a direct impact on resources as more memory read bandwidth is required. When partial images of a frame are being generated it would be ideal to not have to re-read data, however when the image is generated horizontally, memory efficiency does not allow for data to be saved as is done in the previous embodiment. The amount of re-reading can be reduced by increasing the strip height (i.e. the number of pixels in a block). This however has the effect of increasing the amount of data that must be present in a double purpose vertical input buffer 124 at any given time which will increase the size of double purpose vertical input buffer 124.

By introducing sub block processing, the size of double purpose vertical input buffer 124 can be limited to the amount of data required for a single sub-block, while the block size can be increased to achieve a lower requirement of re-reading. As the height of the horizontal strip is programmable, the height of the strip may even be reduced all the way down to a single pixel. This extreme low-latency mode of processing the data in horizontal strips will allow the data to directly flow out of the filter in video scan line order without needing to post buffer the data (data after filtering). The overlap shaded areas that are shown in the figure are simplified for purposes of clarity. The actual data that is re-read to create the overlaps with horizontal strips is data that is defined in the input image space, so unless the scaling is uniform across the image, the overlapped data will not appear as simple constant height across the image.

The random access input buffer that is to be used with the second embodiment is double purpose vertical input buffer 124 which is used in a two fold manner. When data of a block is being processed it is used in the manner as in vertical buffer 16 of the preferred embodiment, as in it is used as a circular buffer. The double purpose vertical input buffer 124 can also be used to prefetch data that is required for processing from subsequent blocks in a horizontal direction as will be described in further detail below with regards to FIG. 16, this allows for the filter to be continuously given data to process, as without this it would be extremely inefficient.

Figure 14:
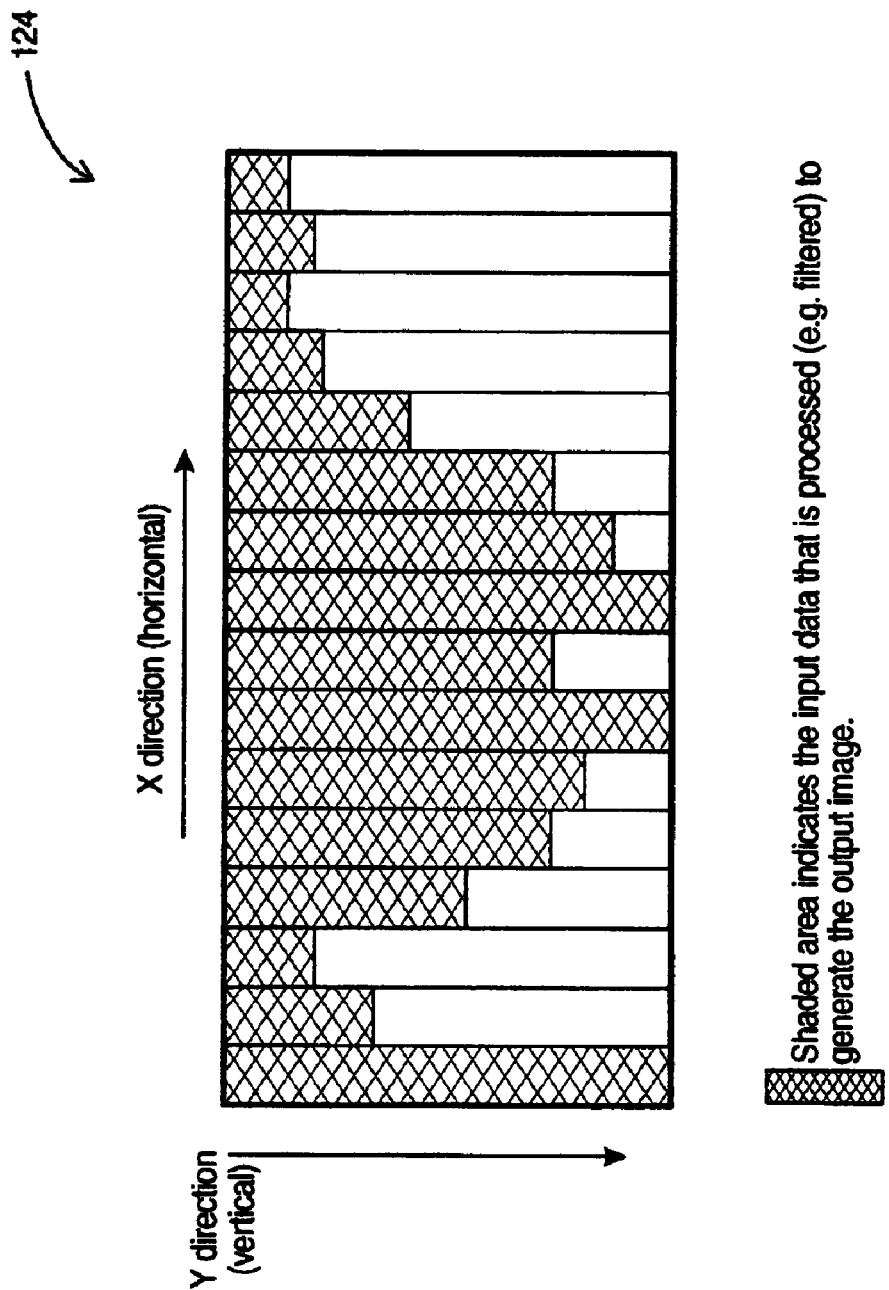
FIG. 14 is a schematic diagram of the buffer and its read and write pointers employed in the alternative embodiment.

Referring now to FIG. 14, there is shown a double purpose vertical input buffer 124. Double purpose vertical input buffer 124 consists of a memory store, 16 write pointers and 16 read pointers, assuming that the width of the memory store is 16 pixels across. The memory store in this embodiment is 16 pixels wide (each pixel is 24 bits) by 512 pixels deep. Double purpose vertical input buffer 124 for this embodiment can be designed for hardware implementation on an application-specific integrated chip (ASIC) with 16 8 bit vectors for read pointers and 16 8 bit vector for write pointers.

Double purpose vertical input buffer 124 maintains read and write pointers for each column. With regards to storage inside this buffer, the data that is to be stored and subsequently processed is stored in such a way that the first location of each column stores the first data sample that is required by that column. This allows for memory to be used more efficiently as there is no data being stored in the top parts of the double purpose vertical input buffer 124 that is not required.

Figure 15:
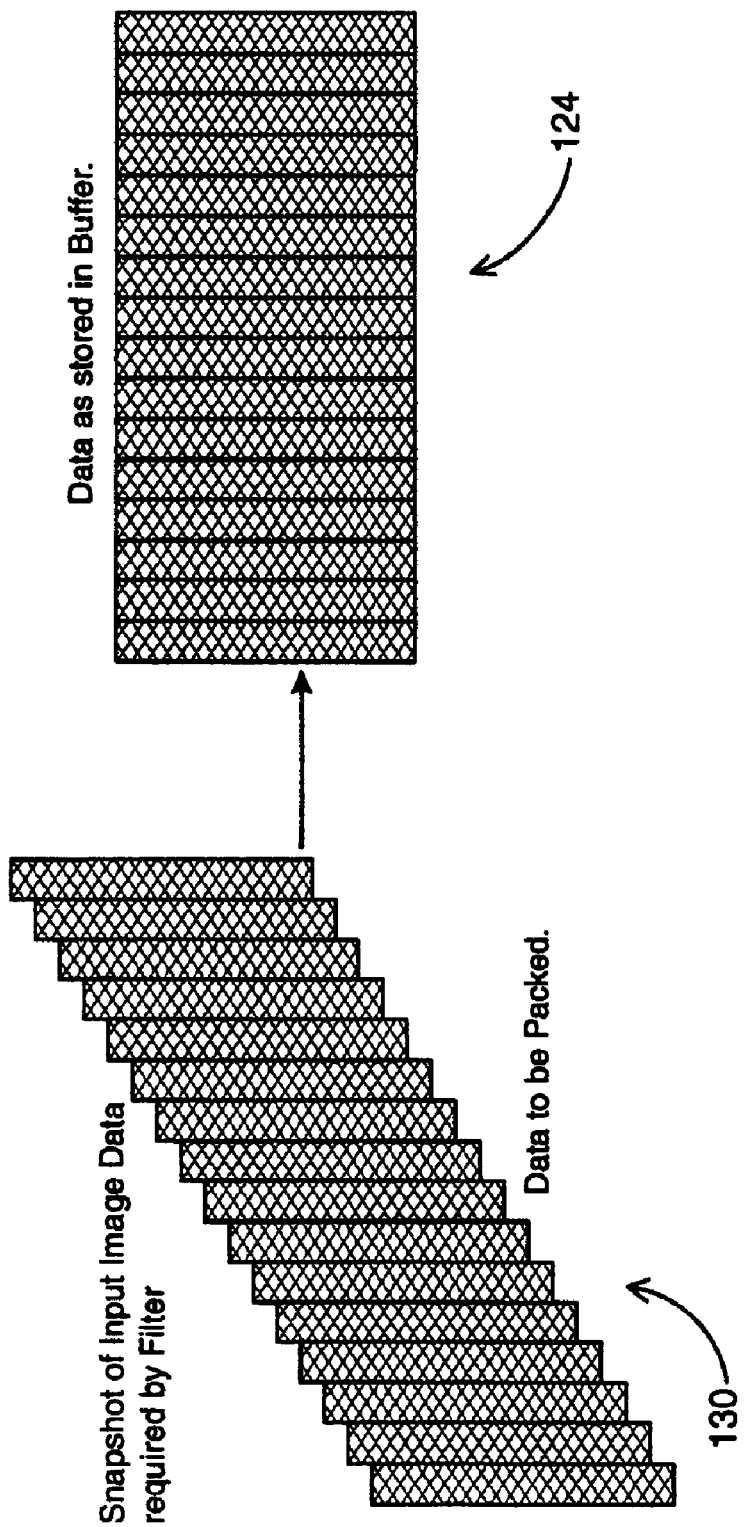
FIG. 15 schematic diagram that illustrates the storage operation of the buffer for data that is at an angle.

Referring now to FIG. 15, there is shown a special vertical input buffer 124, having data stored in it. The data that is on the left side of the figure, a data to be packed 130 is to be stored in double purpose vertical input buffer 124. As described above, the functionality of double purpose vertical input buffer 124 is such that the first location of each column stores the first data sample that is required by that column. The figure illustrates how the data required by the filter which is represented on the left hand side, may be at an angle in the input space (as in not being uniformly down or across), but when it is stored in special vertical input buffer 124 it is stored within each column in a manner that packs it together. As a result of this, less memory is required as data that is not required for filtering is not stored. In order to be able to pack the columns of data in this manner it is important that each column have a read and write pointer so as to be able to write to double purpose vertical input buffer 124 in this manner. In this alternative embodiment the double purpose special vertical input buffer 124 is preferably of size 16 pixels wide by 512 pixels deep.

Figure 16:
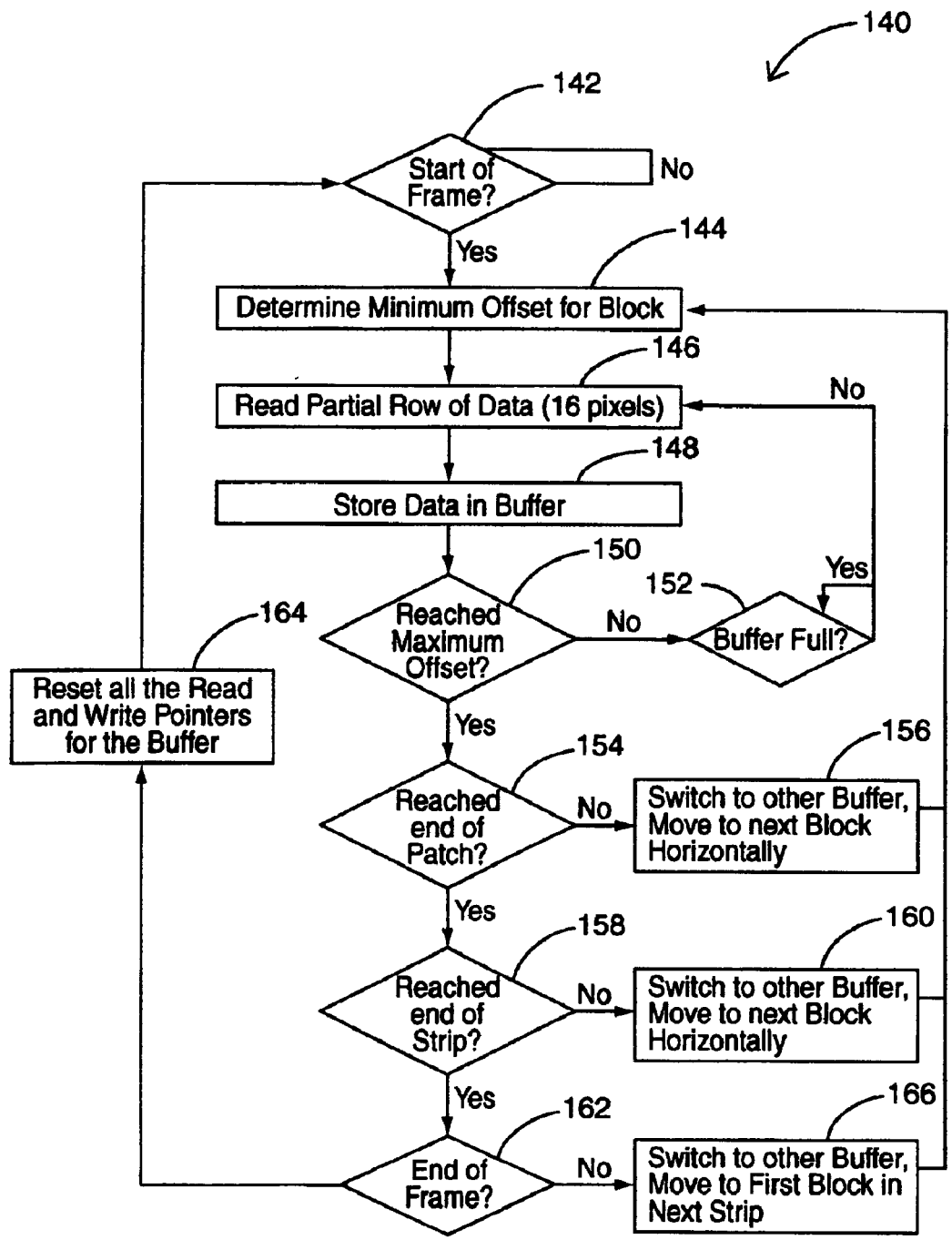
FIG. 16 is detailed flowchart illustrating the buffer control logic for the alternative embodiment of the present invention.

Referring now to FIG. 16, a complete flowchart of optimized processing of data method for low latency mode 140 and control logic for the double purpose vertical input buffer 124 is shown. It should be noted that for the sake of simplicity the method that in which vertical filter 18 accesses the data of double purpose vertical input buffer 124 is not included, what has been included is the description of the way in which optimized processing of data method for low latency mode 140 deals with double purpose vertical input buffer 124. Step (142) checks to see if a new frame is being processed (frame comprises a series of blocks that make up one image).

In step (144) it is determined what the minimum and maximum offset for the block is. This is generated by geometry engine module 24 and it informs double purpose vertical input buffer 124 through buffer parameters module 24 where it needs to start reading data from. This is done because in optimized processing of data for low latency mode there is no skipping of data. In this method, if the data is not needed as is determined by geometry engine module 24 then it will not be read in. This allows for greater system efficiency in that only data that is required for processing is being read to begin with. A row of data that has been read by step (146) will be stored. Step (150) will check if the maximum offset has been reached, meaning whether any more data is required to be read in order to be filtered or processed, this makes use of geometry engine module 24 and its determination of what the maximum offset should be. If step (150) determines that the maximum offset has not been reached, then step (152) will determine whether the buffer is full, this is done by analyzing the orientation of the read and write pointers. If step (152) determines that a buffer is not full, then subsequent rows of data should be read by step (146) and subsequently stored.

At step (154) it is determined whether an end of patch which is a block has been reached. If one has not been reached, then data of subsequent blocks are pre-fetched. Step (156) allows the method to proceed to step (144) where the minimum and maximum offset for the subsequent block in the horizontal direction are determined. As data will then be read in from the subsequent block in step (146) this ensures that data is always in double purpose vertical input buffer 124 so that the filter which is accessing the data does not stall, as in it always has a continuous stream of data to process.

Step (158) determines if an end of strip has been reached by making use of the parameters that are generated by the geometry engine module 20 which sends them through buffer parameter module 20, if an end of strip has not been reached, then step (160) begins to pre-fetch the data that is required for processing of subsequent blocks in an identical manner to that of step (156). If step (158) determines that an end of strip has not been reached, then step (162) determines whether an end of frame has been reached which also employs the parameters that are generated by the geometry engine module 24. If the end of frame has been reached, then this means that all the blocks that were used to generate this image have been processed, and the read and write pointers are reset in step (164). If step (162) determines that an end of frame has not been reached then similar to steps (156) and (160) respectively, pre-fetching of data from another block is undertaken. Reference is made in steps (156), (166) and (160) to switching to another buffer, this is referring to the area of the same double purpose vertical input buffer 124 that can have this pre-fetched data written to.

Figure 17A:
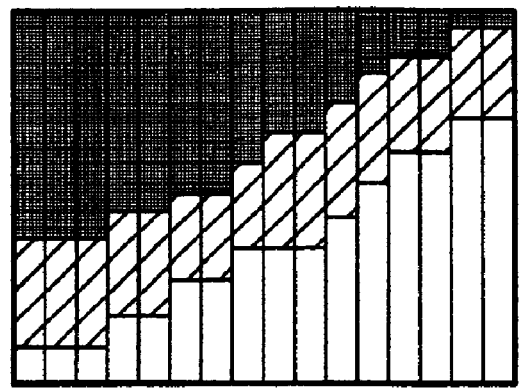
FIGS. 17A to 17C is a series of schematic diagrams illustrating the pointer manipulation of the vertical input buffer of the alternative embodiment.

Referring now to FIGS. 17A and B, there is shown a diagram illustrating the pointer initialization for double purpose vertical input buffer 124. This diagram illustrates an example of how data is stored in double purpose vertical input buffer 124 with the assumption that there are three sub blocks per block. As mentioned previously read and write pointers are maintained for each column. For purposes of clarity and simplification they have not been shown in this diagram.

FIG. 17(A) illustrates how in double purpose vertical input buffer 124 there is data from two sub-blocks of a particular block. The shaded area for example may represent data sub block 1 of block 0 and the horizontally striped area may represent data from sub-block 2 of block 0. Double purpose vertical input buffer 124 is sized so that there is enough space for data of at least two sub blocks to be present at once.

Figure 17B:
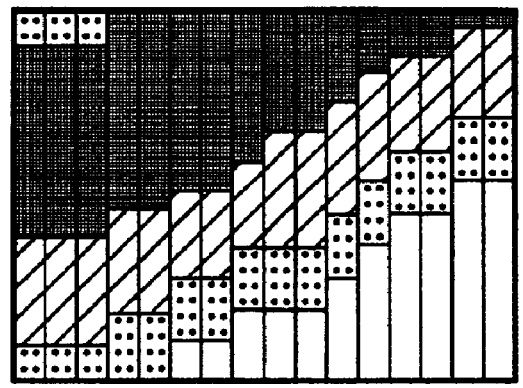
Figure 17C:
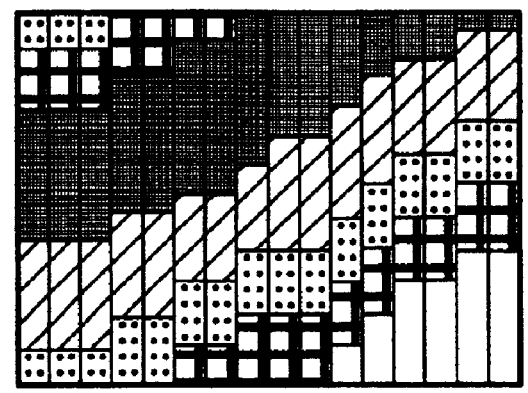

FIG. 17(B) illustrates that after the first sub block has been processed the data that is required for a subsequent sub block is pre-fetched. In this figure, the shaded area is represents data of sub block 1 of block 0 that has been accessed for processing, now data of sub block 3 is being pre-fetched and written to double purpose vertical input buffer 124 and is overwriting data of sub block 1. FIG. 17(C) illustrates how once all the data for all the sub-blocks of block 0 have been read in, dual purpose vertical input buffer 124 pre-fetches data for the next block that is located in a horizontal direction from the current block being processed. Here dual purpose vertical input buffer 124 would receive the start and end address for the data that is to be read that is determined by geometry engine module 24, and the data for the subsequent block would be pre-fetched. This area is represented by the thick black lines in the figure, this therefore means that data from two subsequent blocks are in the buffer at one time. As mentioned before, each column has a read and write pointer that it makes use of.

It is also possible to support this double buffering feature of double purpose vertical input buffer 124 by making use of a second set of read and write pointers for each respective column, where one set of read and write pointers would be used for data of one block and one set of read and write pointers would be used for data of another block.

As will be apparent to those skilled in the art, various modifications and adaptations of the structure described above are possible without departing from the present invention, the scope of which is defined in the appended claims.

What is claimed is:

1. An image data processing method for receiving input image data from a burst memory buffer and providing output image data to a vertical filter for filtering, said method comprising:
    (a) determining whether a new frame of input image data has been received, said frame of data having one or more blocks, each block having one or more rows and columns;
    (b) reading and storing data from the burst memory buffer to a vertical input buffer for processing by a vertical filter, wherein vertical input buffer comprises one or more rows and columns and a plurality of pointers to be used in processing data;
    (c) determining if the entire frame has been processed, and if so, resetting said pointers so as to be able to process new frame of input image data;
    (d) determining if an entire column in the output image has been processed, and if so, resetting said pointers; and
    (e) determining if the entire block has been processed, and if so, repeating (b) to (d).

2. The method of claim 1, wherein the dimension of said blocks is chosen according to the data that is to be processed.

3. The method of claim 1, wherein the vertical filter processes the output image data by processing vertical columns of blocks within the image.

4. The method of claim 1, further comprising the step of using a context memory to store data from previously processed blocks.

5. The method of claim 4, further comprising determining whether a context switch is necessary and if so then using said context memory to allow vertical filter to switch to the next column.

6. An image data processing system for receiving input image data from a burst memory buffer and providing output image data to a vertical filter for filtering, said system comprising:
    (a) a processor for determining whether a new frame of input image data has been received, said frame of data having one or more blocks, each block having one or more rows and columns;
    (b) a vertical input buffer coupled to the processor, said vertical input buffer having one or more rows and columns and a plurality of pointers to be used in processing data;
    (c) a processor for reading and storing data into said vertical input buffer;
    (d) a processor for determining if the entire frame has been processed and if so resetting one or more of said pointers so as to be able to process a new frame of input image data;
    (e) a processor for determining if an entire column has been processed and if so resetting one or more of said pointers; and
    (f) a processor for determining if the entire block has been processed and if so repeating (c) to (e).

7. The system of claim 6, wherein the dimension of said blocks is chosen according to the data that is to be processed.

8. The system of claim 6, wherein the vertical filter processes the output image data by processing vertical columns of blocks within the image.

9. The system of claim 6, further comprising a context memory to store data from previously processed blocks.

10. The system of claim 9, wherein the processor determines whether a context switch is necessary, and if so, said context memory is used to allow said vertical filter to switch to the next column.

11. An image data processing method for receiving input image data from a burst memory buffer and providing output image data to a vertical filter for filtering, said method comprising:
    (a) determining whether a new frame of input image data has been received, said frame of data having one or more blocks, each block having one or more rows and columns and wherein the vertical filter processes the output image data by processing strips comprising horizontal rows of blocks across the image;
    (b) reading and storing data from the burst memory buffer to a vertical input buffer for processing by a vertical filter, wherein the vertical input buffer comprises one or more rows and columns and a plurality of pointers to be used in processing data;
    (c) determining if the entire block has been processed, and if not, repeating (b) for the next horizontal block;
    (d) determining if the entire strip of the output image has been processed, and if not, repeating (b) and (c) for the next horizontal block;
    (e) determining if the entire frame has been processed, and if not, repeating (b) to (d) for the next horizontal block in the next strip and resetting said pointers.

12. The method of claim 11, wherein each block is sub-divided into sub-blocks such that each input image data is processed in sub-blocks.

13. An image data processing system for receiving input image data from a burst memory buffer and providing output image data to a vertical filter for filtering, said system comprising:
    (a) a processor for determining whether a new frame of input image data has been received, said frame of data having one or more blocks, each block having one or more rows and columns and wherein the vertical filter processes the output image data by processing strips comprising horizontal rows of blocks across the image;

(b) a vertical input buffer having one or more rows and columns and a plurality of pointers to be used in processing data;

(c) a processor for determining if the entire block has been processed and if so resetting one or more of said pointers so as to be able to process a new frame of input image data;

(d) a processor for determining if the entire strip of the output image has been processed, and if not, repeating (b) and (c) for the next horizontal block; and (e) a processor for determining if the entire frame has been processed, and if not, repeating (b) to (d) for the next block in the next strip and resetting said pointers.

14. The system of claim 13, wherein each block is sub-divided into sub-blocks such that each input image data is processed in sub-blocks.

* * * * *